United States Patent
Sullivan et al.

(10) Patent No.: US 11,409,597 B2
(45) Date of Patent: Aug. 9, 2022

(54) SYSTEM AND METHODS FOR HARDWARE-SOFTWARE COOPERATIVE PIPELINE ERROR DETECTION

(71) Applicant: NVIDIA Corp., Santa Clara, CA (US)

(72) Inventors: Michael Sullivan, Austin, TX (US); Siva Hari, Sunnyvale, CA (US); Brian Zimmer, Palo Alto, CA (US); Timothy Tsai, Santa Clara, CA (US); Stephen W. Keckler, Austin, TX (US)

(73) Assignee: NVIDIA Corp., Santa Clara, CA (US)

( * ) Notice: Subject to any disclaimer, the term of this patent is extended or adjusted under 35 U.S.C. 154(b) by 172 days.

(21) Appl. No.: 16/811,499

(22) Filed: Mar. 6, 2020

(65) Prior Publication Data
US 2020/0210276 A1    Jul. 2, 2020

Related U.S. Application Data

(63) Continuation-in-part of application No. 15/845,314, filed on Dec. 18, 2017, now Pat. No. 10,621,022.

(60) Provisional application No. 62/567,422, filed on Oct. 3, 2017.

(51) Int. Cl.
  *G06F 11/10*   (2006.01)
  *G06F 9/30*    (2018.01)
  *G06F 11/07*   (2006.01)

(52) U.S. Cl.
  CPC ........ *G06F 11/102* (2013.01); *G06F 9/30029* (2013.01); *G06F 9/30116* (2013.01); *G06F 11/0772* (2013.01); *G06F 11/1044* (2013.01)

(58) Field of Classification Search
  CPC ............... G06F 11/102; G06F 11/0772; G06F 11/1044; G06F 9/30029; G06F 9/30116
  See application file for complete search history.

(56) References Cited

U.S. PATENT DOCUMENTS

| | | | |
|---|---|---|---|
| 7,058,877 | B2 | 6/2006 | Tremblay et al. |
| 7,620,875 | B1 | 11/2009 | Nelson et al. |
| 7,721,075 | B2 | 5/2010 | Thekkath et al. |
| 8,095,825 | B2 | 1/2012 | Hirotsu et al. |
| 8,301,992 | B2 | 10/2012 | Bybell et al. |
| 9,529,653 | B2 | 12/2016 | Bose et al. |
| 2003/0217325 | A1 | 11/2003 | Tremblay et al. |
| 2005/0138478 | A1 | 6/2005 | Safford et al. |
| 2006/0156123 | A1 | 7/2006 | Mukherjee et al. |
| 2010/0122146 | A1* | 5/2010 | Nazarian ............ G06F 11/1072 714/763 |

(Continued)

OTHER PUBLICATIONS

Avizienis, "Arithmetic error codes: Cost and effectiveness studies for application in digital system design," IEEE Transactions on Computers, vol. C-20, pp. 1322-1331, 1971.

(Continued)

*Primary Examiner* — Jigar P Patel
(74) *Attorney, Agent, or Firm* — Rowan TELS LLC

(57) ABSTRACT

An error reporting system utilizes a parity checker to receive data results from execution of an original instruction and a parity bit for the data. A decoder receives an error correcting code (ECC) for data resulting from execution of a shadow instruction of the original instruction, and data error correction is initiated on the original instruction result on condition of a mismatch between the parity bit and the original instruction result, and the decoder asserting a correctable error in the original instruction result.

16 Claims, 14 Drawing Sheets

(56) References Cited

U.S. PATENT DOCUMENTS

| | | | |
|---|---|---|---|
| 2011/0035643 | A1 | 2/2011 | Bybell et al. |
| 2011/0296228 | A1 | 12/2011 | Elnozahy |
| 2013/0283122 | A1 | 10/2013 | Anholt et al. |
| 2015/0277915 | A1 | 10/2015 | Kelm et al. |
| 2015/0377961 | A1 | 12/2015 | Lin et al. |
| 2017/0039103 | A1* | 2/2017 | Engin .................... G11C 29/52 |
| 2017/0109231 | A1* | 4/2017 | Cha ..................... G06F 11/1048 |

OTHER PUBLICATIONS

C. Wang, H. Kim, Y. Wu, and V. Ying, "Compiler-managed software-based redundant multi-threading for transient fault detection," in Preceedings of the International Symposium on Code Generation and Optimization (CGO), 2007.

G. A. Reis, J. Chang, N. Vachharajani, R. Rangan, and D. I. August, "SWIFT: Software implemented fault tolerance," in Proceedings of the International Symposium on Code Generation and Optimization (CGO), pp. 243-254, 2005.

J. Wadden, A. Lyashevsky, S. Gurumurthi, V. Sridharan, and K. Skadron, "Real-world design and evaluation of compiler-managed GPU redundant multithreading," in Proceedings of the International Symposium on Computer Architecture (ISCA), 2014.

M. Dimitrov, M. Mantor, and H. Zhou, "Understanding software approaches for GPGPU reliability," in Proceedings of Workshop on General Purpose Processing on Graphics Processing Units, pp. 94-104, 2009.

N. Oh, P. Shirvani, and E. McCluskey, "Error detection by duplicated instructions in super-scalar processors," IEEE Transactions on Reliability, vol. 51, No. 1, pp. 63-75, 2002.

Michael B. Sullivan et al., "SwapCodes: Error Codes for Hardware-Software Cooperative GPU Pipeline Error Detection", 2018 51st Annual IEEE/ACM International Symposium on Microarchitecture (MICRO), Oct. 24, 2018.

\* cited by examiner

SYSTEM AND METHODS FOR HARDWARE-SOFTWARE COOPERATIVE PIPELINE ERROR DETECTION

CROSS-REFERENCE TO RELATED APPLICATIONS

This application claims priority as a continuation-in-part of U.S. application Ser. No. 15/845,314, titled "SYSTEM AND METHODS FOR HARDWARE-SOFTWARE COOPERATIVE PIPELINE ERROR DETECTION", filed on Dec. 18, 2017, the contents of which are incorporated herein by reference in their entirety.

GOVERNMENT LICENSE RIGHTS

This invention was made with US Government support under Lawrence Livermore National Lab subcontract B620719 awarded by the Department of Energy. The US Government has certain rights in this invention.

BACKGROUND

Compute-class processors typically provide error detection or correction for data storage (e.g., for computational results in registers) using ECC codes, leaving coverage holes for transient errors that occur in pipeline structures such as data path registers and arithmetic logic. Storage ECCs cannot check for pipeline errors because encoding takes place after these errors strike, meaning that valid-yet-incorrect codewords are written back to the register. Any thorough protection scheme must avoid such coverage holes, and systems that demand high levels of reliability, availability, or that operate in harsh conditions must rely on a separate mechanism to protect against these pipeline errors at great expense, typically through some form of spatial or temporal duplication.

A drawback of spatial duplication tends to be its high chip area cost or design complexity. Spatial duplication roughly doubles the amount of hardware needed for the execution pipeline, which is likely to be prohibitively costly in compute-intensive processors such as graphics processing units (GPUs). A more area-efficient alternative to full-duplication-based error detection is to employ specialized concurrent checkers to vet operations as they execute. Such techniques have the opportunity to provide low-latency error detection with relatively little hardware, but they either suffer from limited scope (protecting only a simplified RISC pipeline) or require the significant design complexity and area and power costs of protecting each pipeline operation individually. Temporal duplication is general, user-transparent, and requires no new hardware, but it can incur high performance overheads. For example, one form of temporal duplication is to perform each instruction twice, eventually checking for agreement between the data produced by the original and shadow instructions. This approach uses explicit checking instructions (leading to program bloat), roughly doubles program register usage, and doubles the number of arithmetic operations, potentially leading to a slowdown of 2× or more.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

DETAILED DESCRIPTION

Figure 1:
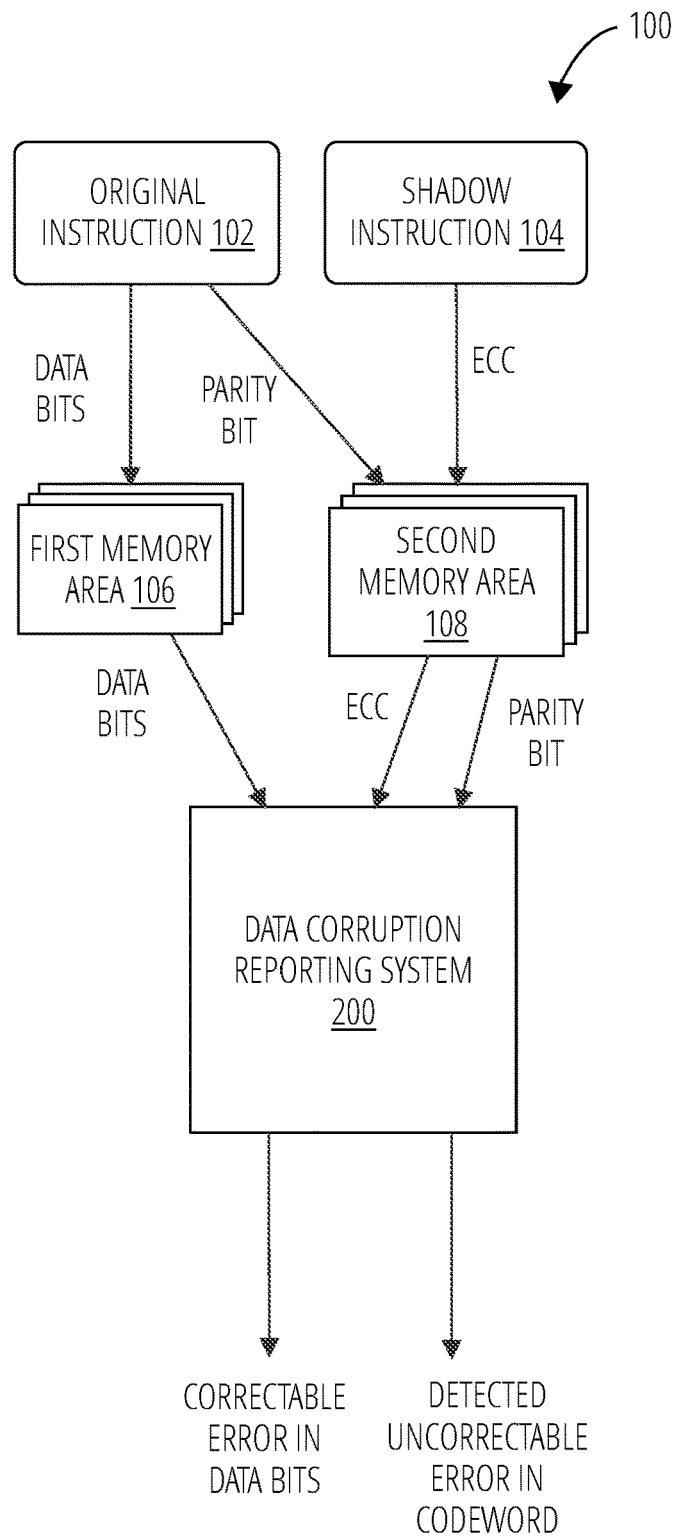
FIG. 1 depicts a data corruption detection system 100 in accordance with one embodiment.

Techniques are disclosed for providing single-bit data storage error correction (e.g., for instruction results stored in a register file) without doubling the register usage. Single-bit pipeline errors are also detected, but not corrected.

Two such techniques are described. These are referred to as SEC-DED-DP and SEC-DP, respectively, where "SEC" indicates single-bit error correcting, "DED" indicates double-bit error detecting, and "DP" indicates data parity. The data bits D1 resulting from execution of the original instruction and a parity bit for the (D1) data bits are written to storage memory (e.g., SRAM banks). The ECC bits for the data bits D2 resulting from execution of the shadow instruction are also written to storage. When the data bits D1 are later read back from storage, the parity bit and ECC bits are used to determine if a single data bit of D1 has been corrupted (and can be repaired by the ECC bits), or whether multiple ECC bits were corrupted (e.g., due to a pipeline error on execution of the shadow instruction). Using these techniques, there is no duplication of the data bits or ECC check bits in storage.

SEC-DED may be implemented without alteration to the ECC decoder or error detecting/correcting hardware to detect and correct single-bit storage errors and to detect double-bit storage errors. However, in some cases there is a risk of mis-correcting for pipeline errors on the shadow instruction. The ECC check bits will detect situations in which the original instruction is altered by a pipeline error, but if the ECC-producing shadow instruction suffers from a single-bit pipeline error, it will erroneously mis-correct the actually error-free data bits unless parity bit enhancements are also applied. Single-bit storage errors in the ECC check-bits are handled in manners that do not utilize the parity bit.

A single-bit pipeline error in the shadow instruction will always corrupt >=3 (SEC-DP) or >=4 (SEC-DED-DP) ECC bits, due to the minimum Hamming distance of the ECC code. Such an error will never masquerade as a single-bit storage error in the ECC bits. In the case of a single-bit storage error in the ECC bits, the data are allowed to pass as they are but the CE? signal (described further below) will not be asserted by the decoder.

SEC-DED-DP and SEC-DP maintain storage error correction for SEC-DED protected storage memory, while avoiding mis-correction of single-bit pipeline errors on the shadow instruction. SEC-DED-DP works for any SEC-DED code, while SEC-DP optimizes parity bit-based SEC-DED with lower storage overhead than SEC-DED-DP. The implementation may utilize either SEC-DED-DP or SEC-DP based on the SEC-DED code in use and the memory design.

SEC-DED with Data Parity (SEC-DED-DP)

SEC-DED-DP stores an extra data parity bit with the ECC check bits, generating this parity bit from only the data bits (excluding the ECC bits). It is not strictly necessary to store the parity bit with the ECC check bits, although this may be preferred for efficiency reasons as explained further below. The parity bit is generated by the original instruction on its data bits result (D1). SEC-DED-DP distinguishes between a single-bit storage error, which is corrected, and a single-bit pipeline error, which is flagged as a DUE.

A single-bit storage error will corrupt the data bits in a manner that is detectable via the parity bit generated by the original instruction for the data bits. SEC-DED-DP enables data bits error correction to be triggered only on condition that a mismatch is detected between the parity bit and the data bits; otherwise a DUE is raised. This maintains the storage error correction capabilities of the un-augmented SEC-DED code, while providing triple-bit error detection for pipeline errors and avoiding the mis-correction of the data bits due to single-bit pipeline errors in the shadow instruction. SEC-DED-DP may augment any underlying SEC-DED protected memory without necessitating ECC code changes or changes to the ECC decoder hardware, provided that the error reporting system is augmented as described further below.

In one embodiment, vector register files are implemented with SRAMs with a separate SRAM to store the ECC check bits for data generated by instructions in many threads. For example the register file may utilize separate 128 b-wide SRAMs for each of the data bits and the ECC check bits. This register file organization may include 16 bits of internal fragmentation per 16 threads, in which the parity bits for the data bits corresponding to the ECCs may be stored without introducing additional storage overhead.

Utilizing a separate SRAM for the ECCs may be desirable for implementations that do not always require ECC protection, enabling the ECC SRAM(s) to be power gated. If the memory is not organized in this way (e.g., if 156-bit wide SRAMs are used to store both data bits and ECCs of the codewords), then SEC-DED-DP requires an extra bit, an increase of 2.6%. Alternatively, an ECC code change may provide SEC-DED levels of protection without any added overhead, as explained below.

SEC with Data Parity (SEC-DP)

An alternative to adding a parity bit for SEC-DED-DP is to downgrade the storage error correcting code to an SEC code (e.g., using only 6 bits of ECC per 32 bits of data to protect) and then append the parity bit to fit within the extra bit that would be taken up by an SEC-DED code. This technique is referred to herein as SEC-DP. The error reporting system for SEC-DP is unchanged from that of SEC-DED-DP (see FIG. 2). Adding a full parity bit to the SEC code, with parity generated across both the data bits and the ECC bits, provides SEC-DED protection.

Accordingly, the SEC-DP parity bit may achieve almost double-bit error detection, and the double-bit error coverage holes may be made less likely through careful storage memory codeword organization. The double-bit errors that are missed by SEC-DP are the ones that affect both of a data bit and an ECC bit. If such an error occurs SEC-DP will mis-correct error-free data bits, potentially causing silent data corruption. Fortunately, the problematic double-bit error patterns do not reduce the SEC-DP pipeline error coverage, because by construction a single pipeline error affects only the data bits or the ECC check bits.

The problematic patterns can be avoided for storage errors through careful organization of codewords within memory. In implementations that utilize vector register files to store multiple codewords (data bits plus ECC) in the same SRAM, it is possible to physically separate the data bits and the ECC check bits such that a single event is highly unlikely to affect both the data bits and the ECC portion of any particular codeword. This implementation utilizes a particular ECC design and register file layout to achieve the same pipeline error coverage as SEC-DED-DP while incorporating the enhanced error detection capabilities of SEC-DED ECCs.

FIG. 1 depicts a data corruption detection system 100 in one embodiment. An original instruction 102 is executed to generate a data bits result and a parity bit for the data bits result. The data bits is stored to a first memory area 106. A shadow instruction 104 is executed (e.g., in parallel with the original instruction 102) and an ECC is computed for the data bits result of the shadow instruction 104. The ECC is stored, along with the corresponding parity bit from the data bits of the original instruction 102, in a second memory area 108 different and not adjacent to the first (e.g., first memory area 106 and second memory area 108 may be different register files). The data bits, ECC, and parity bit are then applied to a data corruption reporting system 200 to signal if there were storage errors or pipeline errors.

Figure 2:
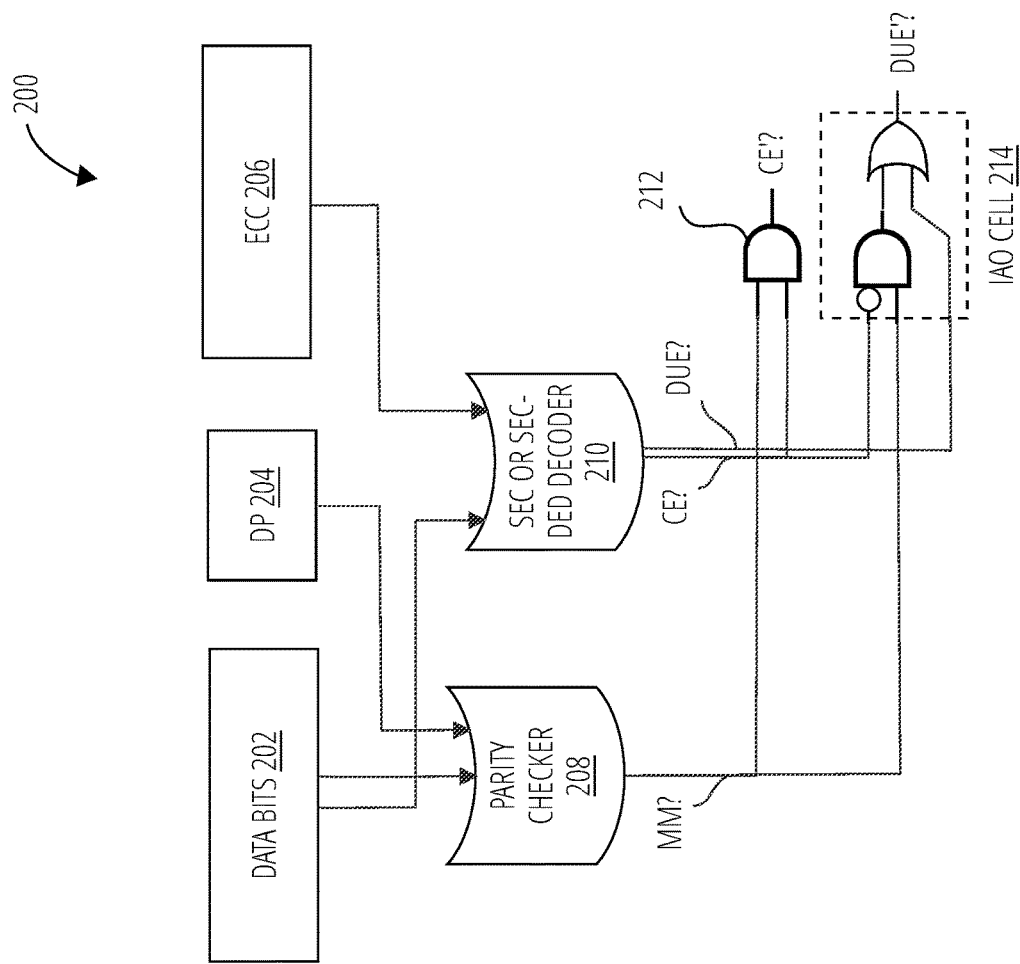
FIG. 2 depicts a data corruption reporting system 200 in accordance with one embodiment.

FIG. 2 depicts a data corruption reporting system 200 in one embodiment. Both of SEC-DED-DP and SEC-DP apply a data-parity check to avoid mis-correcting single-bit compute errors. Table 1 below depicts logic to generate signals called CE? and DUE'?. The CE? signal indicates that data bits error correction was attempted and the DUE? signal indicates a detectable-uncorrectable error. The CE? signal will not raise if the decoder corrects an error in the ECC bits and not the data bits. This situation only arises for storage errors on ECC, not for ECC corruption due to pipeline errors.

TABLE 1

| CE?/MM? | CE'? |
|---|---|
| 1/1 | 1 (storage) |
| otherwise | 0 (pipeline) |
| Conditions | DUE'? |
| CE?/MM? = 0/1 or DUE? | 1 |
| otherwise | 0 |

In Table 1, signals CE and DUE (without a post-pended ') are decoder outputs, whereas CE' and DUE' are these decoder outputs adjusted based on the parity bit. The data corruption reporting system 200 receives the data bits 202, parity bit 204, and ECC 206. A parity checker 208 and an SEC or SEC-DED decoder 210 are applied to these inputs to generate output signals CE?, MM? (parity check signal), and DUE?. An AND gate 212 transforms CE? and MM? into the CE'? signal, and an IAO cell 214 (invert, AND, OR logic block) transforms CE?, MM?, and DUE? into the DUE'? signal.

Figure 3:
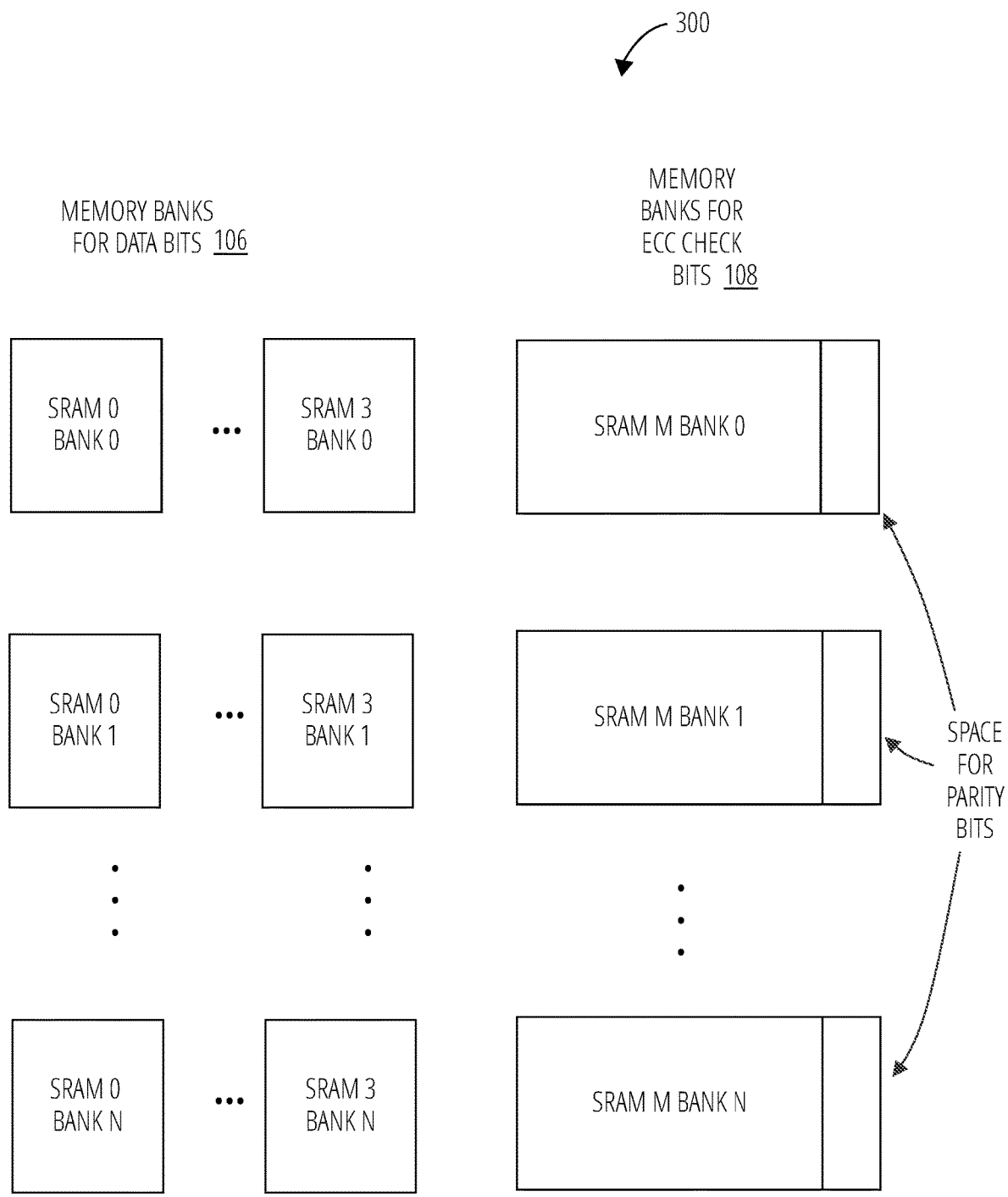
FIG. 3 depicts a memory organization 300 in accordance with one embodiment.
Figure 4:
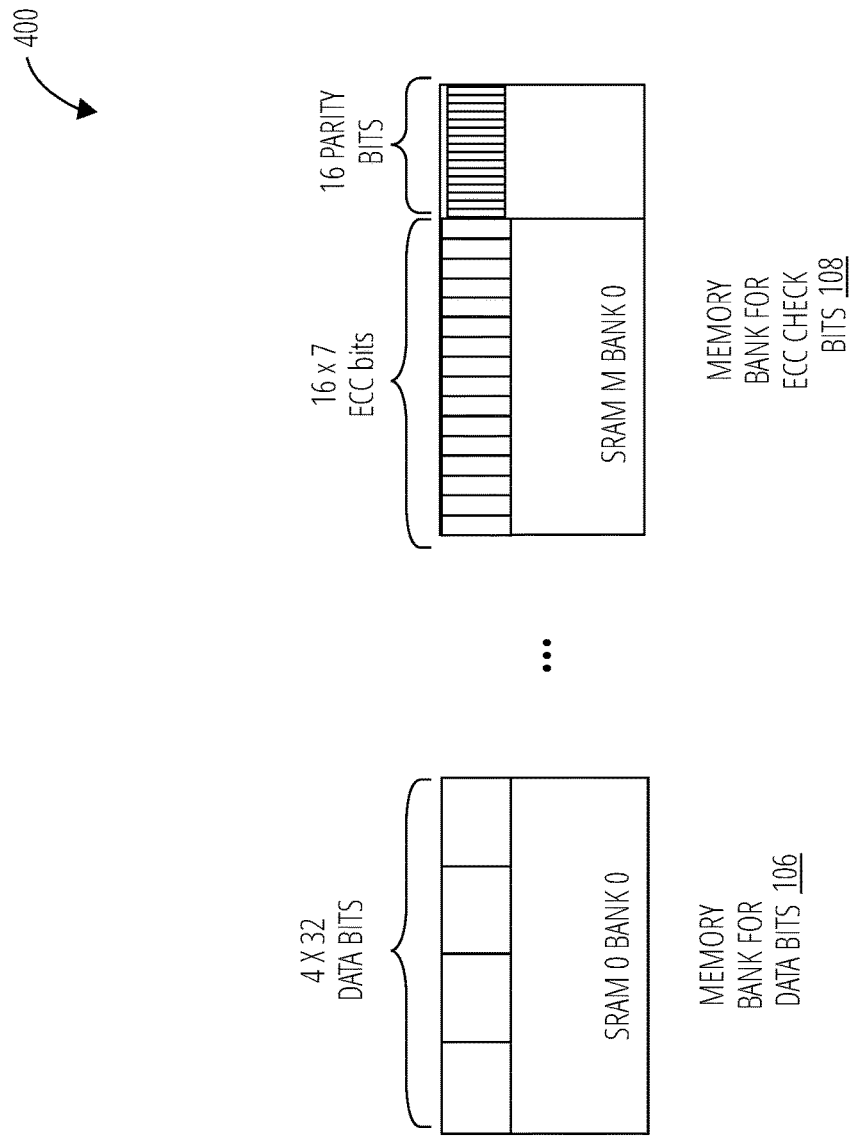
FIG. 4 illustrates a storage layout 400 in accordance with one embodiment.

FIG. 3 depicts a memory organization 300 in one embodiment. Each SRAM bank may be 128 bits wide, with the 32 bit data bits from each of four threads occupying the width of each bank allocated for the data bits (left side banks in FIG. 3). Each bank allocated for ECCs (right side banks in FIG. 3) may use 112 bits (16×7 bits) for the 7 bit ECCs of 16 threads, with 16 bits of width left over for the parity bits of the 16 data bits corresponding to the 16 ECCs. This storage layout 400 is depicted in FIG. 4.

Figure 5:
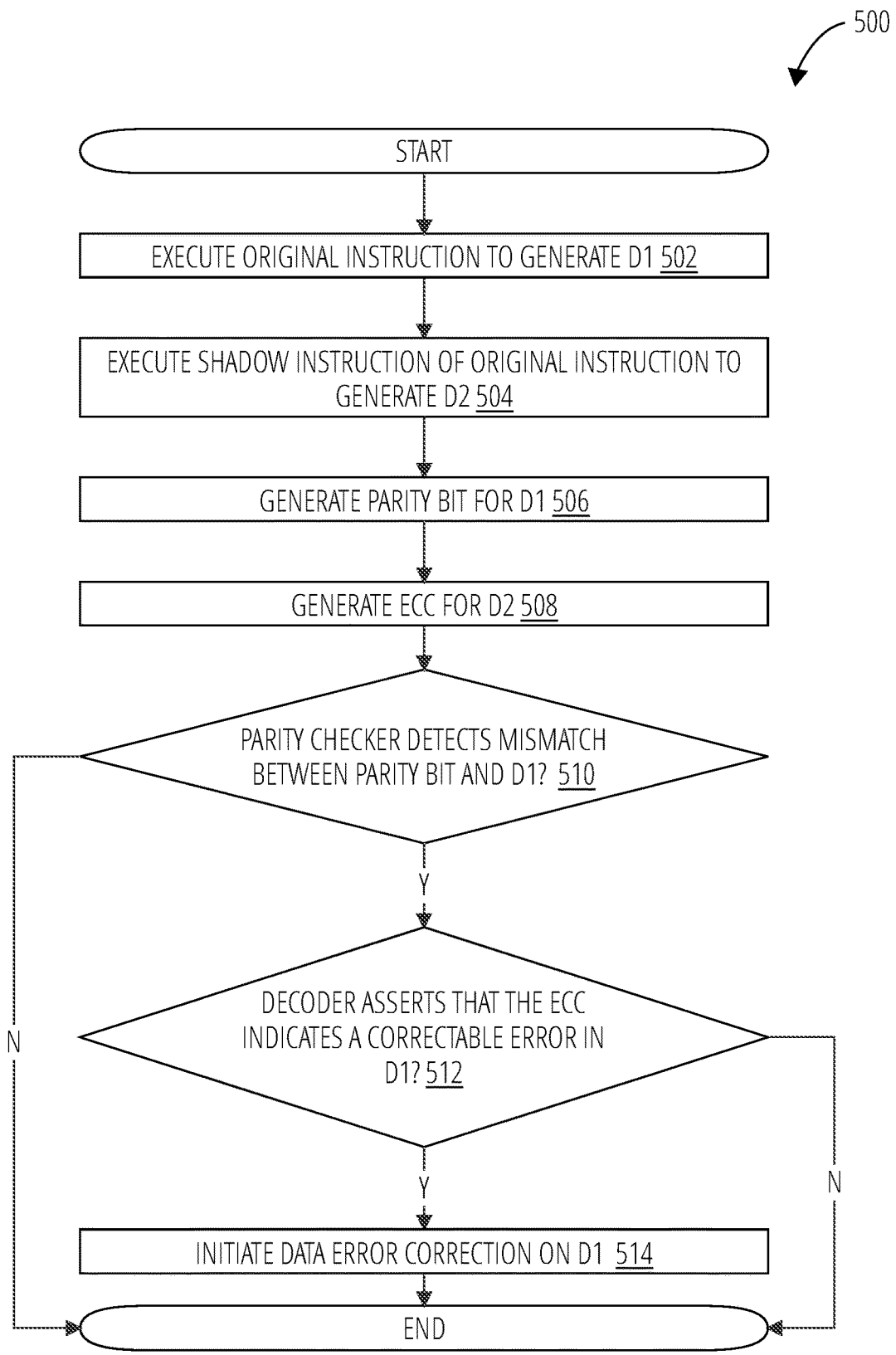
FIG. 5 depicts an instruction execution and error correction initiation routine 500 in accordance with one embodiment.

FIG. 5 depicts an instruction execution and error correction initiation routine 500 in one embodiment. An original instruction is executed at block 502 to generate a resulting data portion D1, and a shadow instruction of the original instruction is executed at block 504 to generate a resulting data portion D2. A parity bit for D1 is generated at block 506 and an ECC for D2 is generated at block 508. At decision block 510, decision block 512, and block 514, data error correction is initiated on D1 on condition that a parity checker detects a mismatch between the parity bit and D1, and a decoder asserts that the ECC indicates a correctable error in D1.

Figure 6:
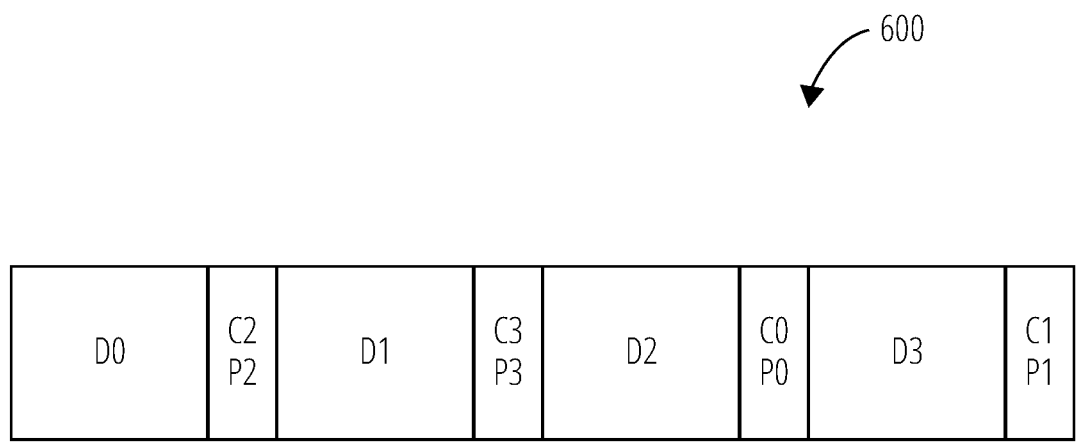
FIG. 6 depicts a codeword storage layout 600 in accordance with one embodiment.

FIG. 6 depicts a codeword storage layout 600 in one embodiment. This codeword storage layout 600 organizes the data bits (numbered D blocks) and the ECCs and parity bits (numbered C blocks) to avoid or mitigate problematic SEC-DP double-bit storage errors.

Figure 7:
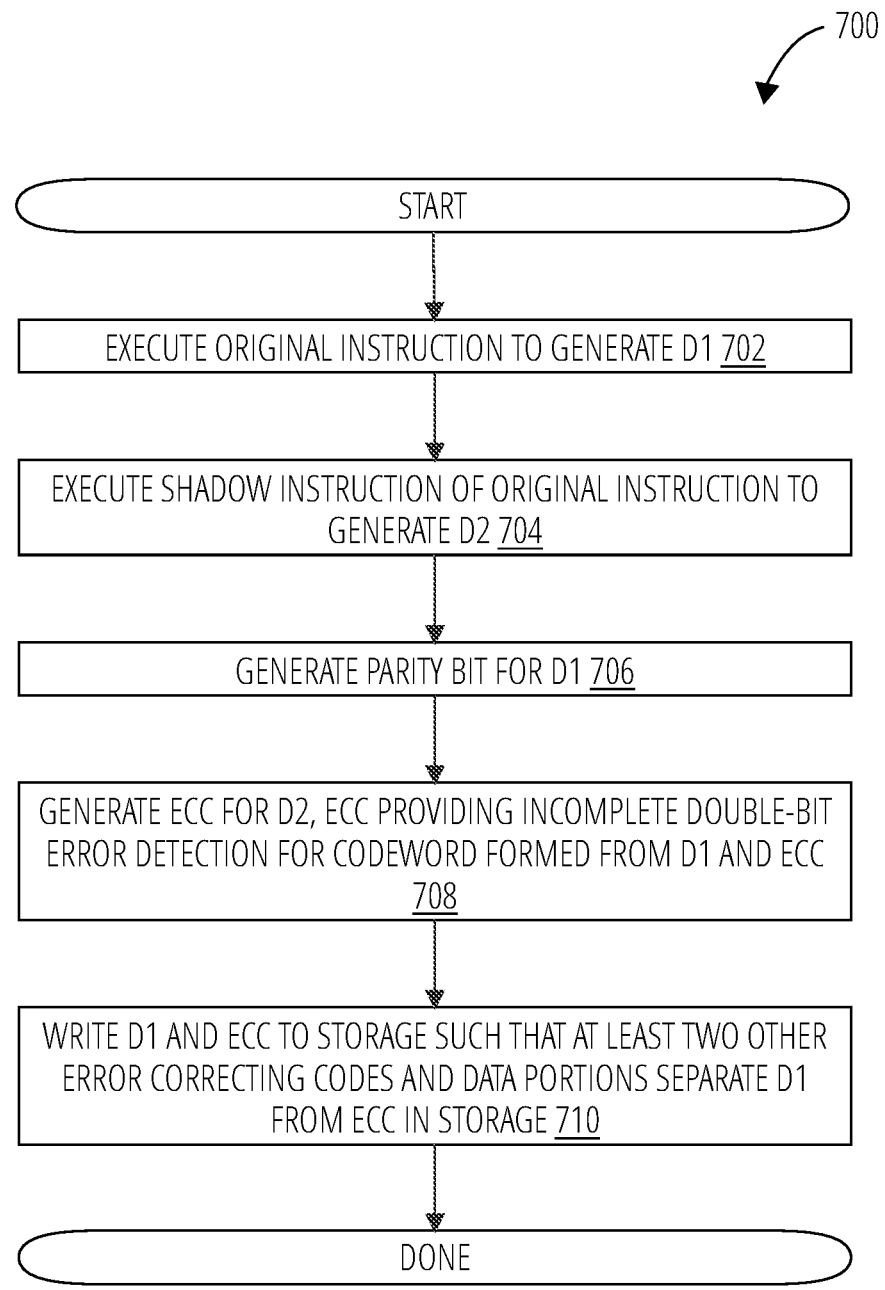
FIG. 7 depicts an instruction execution and storage routine 700 in accordance with one embodiment.

FIG. 7 depicts an instruction execution and storage routine 700 in one embodiment. An original instruction is executed (block 702) to generate a resulting data bits D1 and a shadow instruction of the original instruction is also executed (block 704) to generate a resulting data bits D2. A parity bit is generated for D1 at block 706 and an ECC is generated for D2 at block 708, the ECC providing incomplete double-bit error detection for a codeword formed from D1 and ECC. D1 and ECC are written at block 710 to storage such that at least two other error correcting codes and data portions separate D1 from ECC in the storage memory.

The algorithms and techniques disclosed herein may be executed by computing devices utilizing one or more graphic processing unit (GPU) and/or general purpose data processor (e.g., a 'central processing unit or CPU). Exemplary architectures will now be described that may be configured to carry out the techniques disclosed herein on such devices.

The following description may use certain acronyms and abbreviations as follows:
"DPC" refers to a "data processing cluster";
"GPC" refers to a "general processing cluster";
"I/O" refers to a "input/output";
"L1 cache" refers to "level one cache";
"L2 cache" refers to "level two cache";
"LSU" refers to a "load/store unit";
"MMU" refers to a "memory management unit";
"MPC" refers to an "M-pipe controller";
"PPU" refers to a "parallel processing unit";
"PROP" refers to a "pre-raster operations unit";
"ROP" refers to a "raster operations";
"SFU" refers to a "special function unit";
"SM" refers to a "streaming multiprocessor";
"Viewport SCC" refers to "viewport scale, cull, and clip";
"WDX" refers to a "work distribution crossbar"; and
"XBar" refers to a "crossbar".

Parallel Processing Unit

Figure 8:
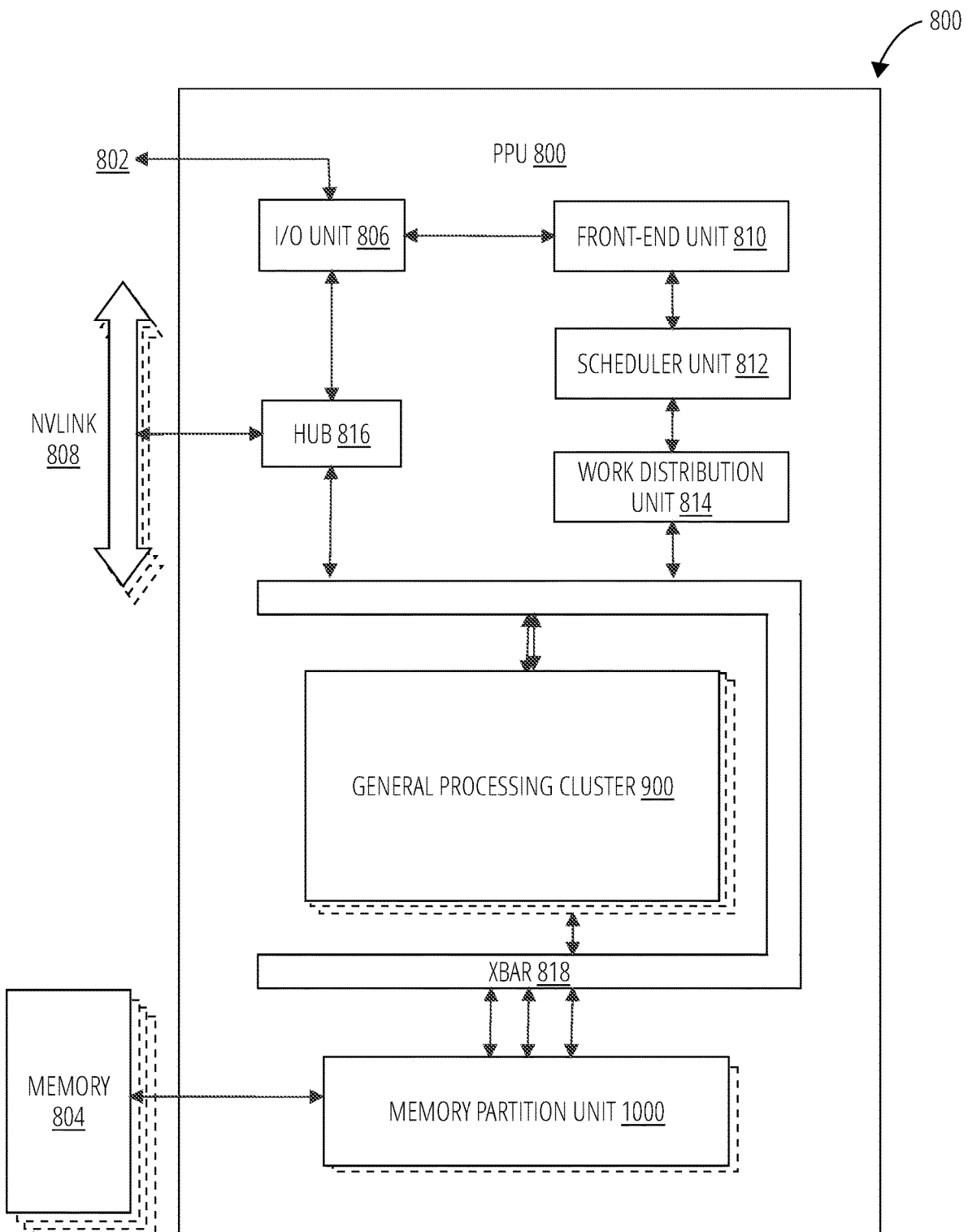
FIG. 8 depicts a parallel processing unit 800 in accordance with one embodiment.

FIG. 8 depicts a parallel processing unit 800, in accordance with an embodiment. In an embodiment, the parallel processing unit 800 is a multi-threaded processor that is implemented on one or more integrated circuit devices. The parallel processing unit 800 is a latency hiding architecture designed to process many threads in parallel. A thread (e.g., a thread of execution) is an instantiation of a set of instructions configured to be executed by the parallel processing unit 800. In an embodiment, the parallel processing unit 800 is a graphics processing unit (GPU) configured to implement a graphics rendering pipeline for processing three-dimensional (3D) graphics data in order to generate two-dimensional (2D) image data for display on a display device such as a liquid crystal display (LCD) device. In other embodiments, the parallel processing unit 800 may be utilized for performing general-purpose computations. While one exemplary parallel processor is provided herein for illustrative purposes, it should be strongly noted that such processor is set forth for illustrative purposes only, and that any processor may be employed to supplement and/or substitute for the same.

One or more parallel processing unit 800 modules may be configured to accelerate thousands of High Performance Computing (HPC), data center, and machine learning applications. The parallel processing unit 800 may be configured to accelerate numerous deep learning systems and applications including autonomous vehicle platforms, deep learning, high-accuracy speech, image, and text recognition systems, intelligent video analytics, molecular simulations, drug discovery, disease diagnosis, weather forecasting, big data analytics, astronomy, molecular dynamics simulation, financial modeling, robotics, factory automation, real-time language translation, online search optimizations, and personalized user recommendations, and the like.

As shown in FIG. 8, the parallel processing unit 800 includes an I/O unit 806, a front-end unit 810, a scheduler unit 812, a work distribution unit 814, a hub 816, a crossbar 818, one or more general processing cluster 900 modules, and one or more memory partition unit 1000 modules. The parallel processing unit 800 may be connected to a host processor or other parallel processing unit 800 modules via one or more high-speed NVLink 808 interconnects. The parallel processing unit 800 may be connected to a host processor or other peripheral devices via an interconnect 802. The parallel processing unit 800 may also be connected to a local memory comprising a number of memory 804 devices. In an embodiment, the local memory may comprise a number of dynamic random access memory (DRAM) devices. The DRAM devices may be configured as a high-bandwidth memory (HBM) subsystem, with multiple DRAM dies stacked within each device. The memory 804 may comprise logic to configure the parallel processing unit 800 to carry out aspects of the techniques disclosed herein.

The NVLink 808 interconnect enables systems to scale and include one or more parallel processing unit 800 modules combined with one or more CPUs, supports cache coherence between the parallel processing unit 800 modules and CPUs, and CPU mastering. Data and/or commands may be transmitted by the NVLink 808 through the hub 816 to/from other units of the parallel processing unit 800 such as one or more copy engines, a video encoder, a video decoder, a power management unit, etc. (not explicitly shown). The NVLink 808 is described in more detail in conjunction with FIG. 12.

The I/O unit 806 is configured to transmit and receive communications (e.g., commands, data, etc.) from a host processor (not shown) over the interconnect 802. The I/O unit 806 may communicate with the host processor directly via the interconnect 802 or through one or more intermediate devices such as a memory bridge. In an embodiment, the I/O unit 806 may communicate with one or more other processors, such as one or more parallel processing unit 800 modules via the interconnect 802. In an embodiment, the I/O unit 806 implements a Peripheral Component Interconnect Express (PCIe) interface for communications over a PCIe bus and the interconnect 802 is a PCIe bus. In alternative embodiments, the I/O unit 806 may implement other types of well-known interfaces for communicating with external devices.

The I/O unit 806 decodes packets received via the interconnect 802. In an embodiment, the packets represent commands configured to cause the parallel processing unit 800 to perform various operations. The I/O unit 806 transmits the decoded commands to various other units of the parallel processing unit 800 as the commands may specify. For example, some commands may be transmitted to the front-end unit 810. Other commands may be transmitted to the hub 816 or other units of the parallel processing unit 800 such as one or more copy engines, a video encoder, a video decoder, a power management unit, etc. (not explicitly shown). In other words, the I/O unit 806 is configured to route communications between and among the various logical units of the parallel processing unit 800.

In an embodiment, a program executed by the host processor encodes a command stream in a buffer that provides workloads to the parallel processing unit 800 for processing. A workload may comprise several instructions and data to be processed by those instructions. The buffer is a region in a memory that is accessible (e.g., read/write) by both the host processor and the parallel processing unit 800. For example, the I/O unit 806 may be configured to access the buffer in a system memory connected to the interconnect 802 via memory requests transmitted over the interconnect 802. In an embodiment, the host processor writes the command stream to the buffer and then transmits a pointer to the start of the command stream to the parallel processing unit 800. The front-end unit 810 receives pointers to one or more command streams. The front-end unit 810 manages the one or more streams, reading commands from the streams and forwarding commands to the various units of the parallel processing unit 800.

The front-end unit 810 is coupled to a scheduler unit 812 that configures the various general processing cluster 900 modules to process tasks defined by the one or more streams. The scheduler unit 812 is configured to track state information related to the various tasks managed by the scheduler unit 812. The state may indicate which general processing cluster 900 a task is assigned to, whether the task is active or inactive, a priority level associated with the task, and so forth. The scheduler unit 812 manages the execution of a plurality of tasks on the one or more general processing cluster 900 modules.

The scheduler unit 812 is coupled to a work distribution unit 814 that is configured to dispatch tasks for execution on the general processing cluster 900 modules. The work distribution unit 814 may track a number of scheduled tasks received from the scheduler unit 812. In an embodiment, the work distribution unit 814 manages a pending task pool and an active task pool for each of the general processing cluster 900 modules. The pending task pool may comprise a number of slots (e.g., 32 slots) that contain tasks assigned to be processed by a particular general processing cluster 900. The active task pool may comprise a number of slots (e.g., 4 slots) for tasks that are actively being processed by the general processing cluster 900 modules. As a general processing cluster 900 finishes the execution of a task, that task is evicted from the active task pool for the general processing cluster 900 and one of the other tasks from the pending task pool is selected and scheduled for execution on the general processing cluster 900. If an active task has been idle on the general processing cluster 900, such as while waiting for a data dependency to be resolved, then the active task may be evicted from the general processing cluster 900 and returned to the pending task pool while another task in the pending task pool is selected and scheduled for execution on the general processing cluster 900.

The work distribution unit 814 communicates with the one or more general processing cluster 900 modules via crossbar 818. The crossbar 818 is an interconnect network that couples many of the units of the parallel processing unit 800 to other units of the parallel processing unit 800. For example, the crossbar 818 may be configured to couple the work distribution unit 814 to a particular general processing cluster 900. Although not shown explicitly, one or more other units of the parallel processing unit 800 may also be connected to the crossbar 818 via the hub 816.

The tasks are managed by the scheduler unit 812 and dispatched to a general processing cluster 900 by the work distribution unit 814. The general processing cluster 900 is configured to process the task and generate results. The results may be consumed by other tasks within the general processing cluster 900, routed to a different general processing cluster 900 via the crossbar 818, or stored in the memory 804. The results can be written to the memory 804 via the memory partition unit 1000 modules, which implement a memory interface for reading and writing data to/from the memory 804. The results can be transmitted to another parallel processing unit 800 or CPU via the NVLink 808. In an embodiment, the parallel processing unit 800 includes a number U of memory partition unit 1000 modules that is equal to the number of separate and distinct memory 804 devices coupled to the parallel processing unit 800. A memory partition unit 1000 will be described in more detail below in conjunction with FIG. 10.

In an embodiment, a host processor executes a driver kernel that implements an application programming interface (API) that enables one or more applications executing on the host processor to schedule operations for execution on the parallel processing unit 800. In an embodiment, multiple compute applications are simultaneously executed by the parallel processing unit 800 and the parallel processing unit 800 provides isolation, quality of service (QoS), and independent address spaces for the multiple compute applications. An application may generate instructions (e.g., API calls) that cause the driver kernel to generate one or more tasks for execution by the parallel processing unit 800. The driver kernel outputs tasks to one or more streams being processed by the parallel processing unit 800. Each task may comprise one or more groups of related threads, referred to herein as a warp. In an embodiment, a warp comprises 32 related threads that may be executed in parallel. Cooperating threads may refer to a plurality of threads including instructions to perform the task and that may exchange data through shared memory. Threads and cooperating threads are described in more detail in conjunction with FIG. 11.

Figure 9:
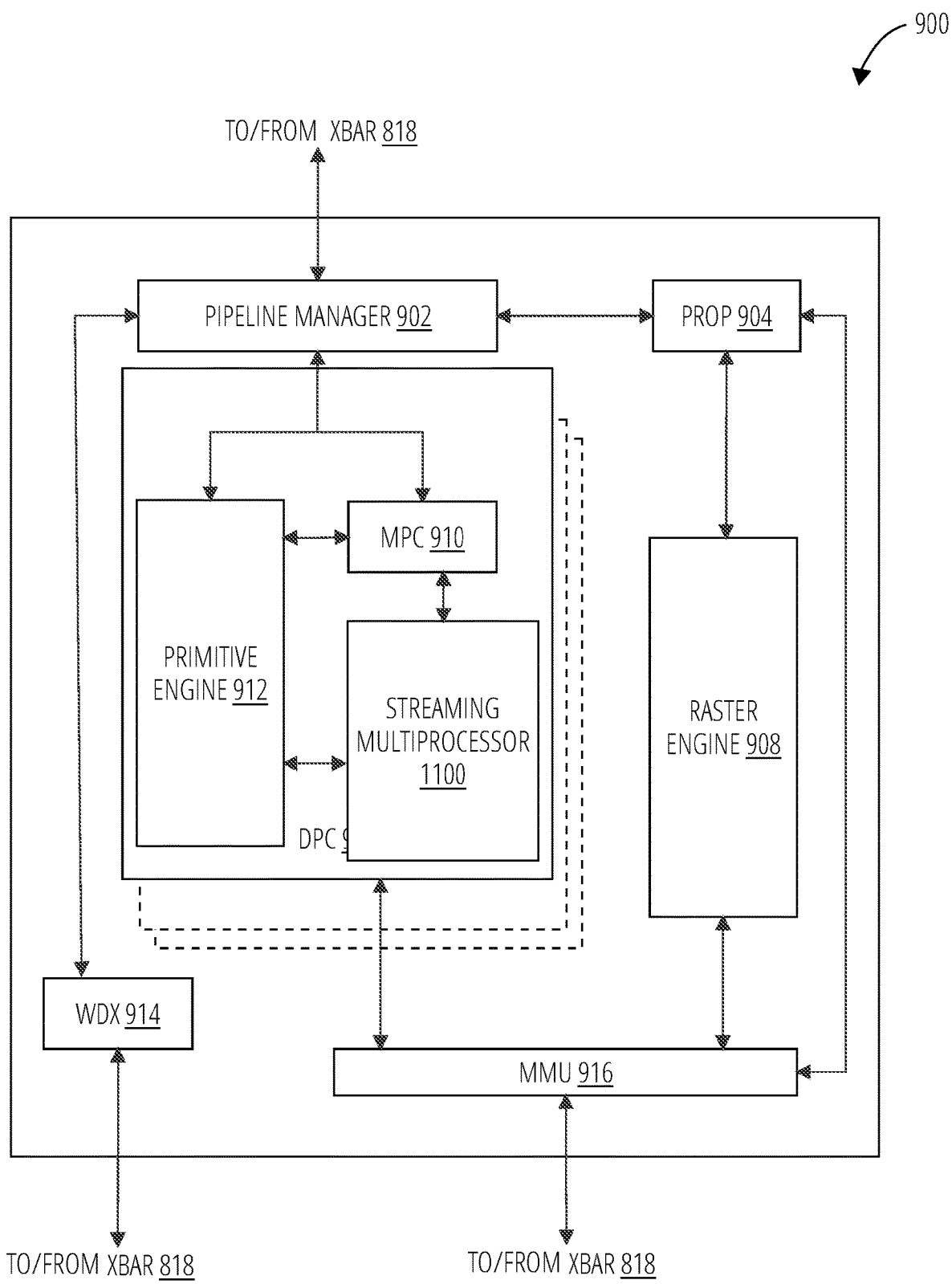
FIG. 9 depicts a general processing cluster 900 in accordance with one embodiment.

FIG. 9 depicts a general processing cluster 900 of the parallel processing unit 800 of FIG. 8, in accordance with an embodiment. As shown in FIG. 9, each general processing cluster 900 includes a number of hardware units for processing tasks. In an embodiment, each general processing cluster 900 includes a pipeline manager 902, a pre-raster operations unit 904, a raster engine 908, a work distribution crossbar 914, a memory management unit 916, and one or more data processing cluster 906. It will be appreciated that the general processing cluster 900 of FIG. 9 may include other hardware units in lieu of or in addition to the units shown in FIG. 9.

In an embodiment, the operation of the general processing cluster 900 is controlled by the pipeline manager 902. The pipeline manager 902 manages the configuration of the one or more data processing cluster 906 modules for processing tasks allocated to the general processing cluster 900. In an embodiment, the pipeline manager 902 may configure at least one of the one or more data processing cluster 906 modules to implement at least a portion of a graphics rendering pipeline. For example, a data processing cluster 906 may be configured to execute a vertex shader program on the programmable streaming multiprocessor 1100. The pipeline manager 902 may also be configured to route packets received from the work distribution unit 814 to the appropriate logical units within the general processing cluster 900. For example, some packets may be routed to fixed function hardware units in the pre-raster operations unit 904 and/or raster engine 908 while other packets may be routed to the data processing cluster 906 modules for processing by the primitive engine 912 or the streaming multiprocessor 1100. In an embodiment, the pipeline manager 902 may configure at least one of the one or more data processing cluster 906 modules to implement a neural network model and/or a computing pipeline.

Figure 10:
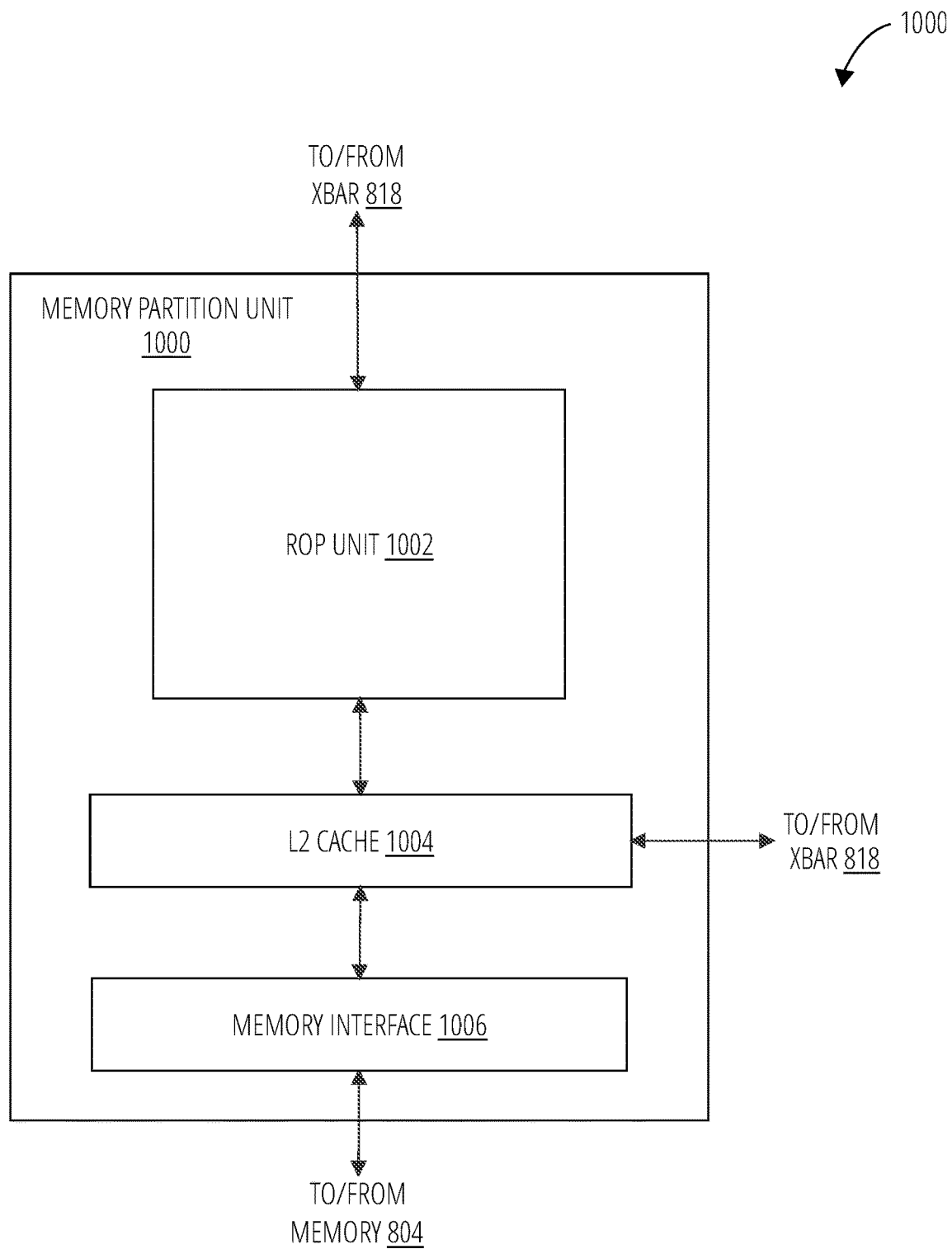
FIG. 10 depicts a memory partition unit 1000 in accordance with one embodiment.

The pre-raster operations unit 904 is configured to route data generated by the raster engine 908 and the data processing cluster 906 modules to a Raster Operations (ROP) unit, described in more detail in conjunction with FIG. 10. The pre-raster operations unit 904 may also be configured to perform optimizations for color blending, organize pixel data, perform address translations, and the like.

The raster engine 908 includes a number of fixed function hardware units configured to perform various raster operations. In an embodiment, the raster engine 908 includes a setup engine, a coarse raster engine, a culling engine, a clipping engine, a fine raster engine, and a tile coalescing engine. The setup engine receives transformed vertices and generates plane equations associated with the geometric primitive defined by the vertices. The plane equations are transmitted to the coarse raster engine to generate coverage information (e.g., an x, y coverage mask for a tile) for the primitive. The output of the coarse raster engine is transmitted to the culling engine where fragments associated with the primitive that fail a z-test are culled, and transmitted to a clipping engine where fragments lying outside a viewing frustum are clipped. Those fragments that survive clipping and culling may be passed to the fine raster engine to generate attributes for the pixel fragments based on the plane equations generated by the setup engine. The output of the raster engine 908 comprises fragments to be processed, for example, by a fragment shader implemented within a data processing cluster 906.

Each data processing cluster 906 included in the general processing cluster 900 includes an M-pipe controller 910, a primitive engine 912, and one or more streaming multiprocessor 1100 modules. The M-pipe controller 910 controls the operation of the data processing cluster 906, routing packets received from the pipeline manager 902 to the appropriate units in the data processing cluster 906. For example, packets associated with a vertex may be routed to the primitive engine 912, which is configured to fetch vertex attributes associated with the vertex from the memory 804. In contrast, packets associated with a shader program may be transmitted to the streaming multiprocessor 1100.

The streaming multiprocessor 1100 comprises a programmable streaming processor that is configured to process tasks represented by a number of threads. Each streaming multiprocessor 1100 is multi-threaded and configured to execute a plurality of threads (e.g., 32 threads) from a particular group of threads concurrently. In an embodiment, the streaming multiprocessor 1100 implements a Single-Instruction, Multiple-Data (SIMD) architecture where each thread in a group of threads (e.g., a warp) is configured to process a different set of data based on the same set of instructions. All threads in the group of threads execute the same instructions. In another embodiment, the streaming multiprocessor 1100 implements a Single-Instruction, Multiple Thread (SIMT) architecture where each thread in a group of threads is configured to process a different set of data based on the same set of instructions, but where individual threads in the group of threads are allowed to diverge during execution. In an embodiment, a program counter, call stack, and execution state is maintained for each warp, enabling concurrency between warps and serial execution within warps when threads within the warp diverge. In another embodiment, a program counter, call stack, and execution state is maintained for each individual thread, enabling equal concurrency between all threads, within and between warps. When execution state is maintained for each individual thread, threads executing the same instructions may be converged and executed in parallel for maximum efficiency. The streaming multiprocessor 1100 will be described in more detail below in conjunction with FIG. 11.

The memory management unit 916 provides an interface between the general processing cluster 900 and the memory partition unit 1000. The memory management unit 916 may provide translation of virtual addresses into physical addresses, memory protection, and arbitration of memory requests. In an embodiment, the memory management unit 916 provides one or more translation lookaside buffers (TLBs) for performing translation of virtual addresses into physical addresses in the memory 804.

FIG. 10 depicts a memory partition unit 1000 of the parallel processing unit 800 of FIG. 8, in accordance with an embodiment. As shown in FIG. 10, the memory partition unit 1000 includes a raster operations unit 1002, a level two cache 1004, and a memory interface 1006. The memory interface 1006 is coupled to the memory 804. Memory interface 1006 may implement 32, 64, 128, 1024-bit data buses, or the like, for high-speed data transfer. In an embodiment, the parallel processing unit 800 incorporates U memory interface 1006 modules, one memory interface 1006 per pair of memory partition unit 1000 modules, where each pair of memory partition unit 1000 modules is connected to a corresponding memory 804 device. For example, parallel processing unit 800 may be connected to up to Y memory 804 devices, such as high bandwidth memory stacks or graphics double-data-rate, version 5, synchronous dynamic random access memory, or other types of persistent storage.

In an embodiment, the memory interface 1006 implements an HBM2 memory interface and Y equals half U. In an embodiment, the HBM2 memory stacks are located on the same physical package as the parallel processing unit 800, providing substantial power and area savings compared with conventional GDDR5 SDRAM systems. In an embodiment, each HBM2 stack includes four memory dies and Y equals 4, with HBM2 stack including two 128-bit channels per die for a total of 8 channels and a data bus width of 1024 bits.

In an embodiment, the memory 804 supports Single-Error Correcting Double-Error Detecting (SECDED) Error Correction Code (ECC) to protect data. ECC provides higher reliability for compute applications that are sensitive to data corruption. Reliability is especially important in large-scale cluster computing environments where parallel processing unit 800 modules process very large datasets and/or run applications for extended periods.

In an embodiment, the parallel processing unit 800 implements a multi-level memory hierarchy. In an embodiment, the memory partition unit 1000 supports a unified memory to provide a single unified virtual address space for CPU and parallel processing unit 800 memory, enabling data sharing between virtual memory systems. In an embodiment the frequency of accesses by a parallel processing unit 800 to memory located on other processors is traced to ensure that memory pages are moved to the physical memory of the parallel processing unit 800 that is accessing the pages more frequently. In an embodiment, the NVLink 808 supports address translation services allowing the parallel processing unit 800 to directly access a CPU's page tables and providing full access to CPU memory by the parallel processing unit 800.

In an embodiment, copy engines transfer data between multiple parallel processing unit 800 modules or between parallel processing unit 800 modules and CPUs. The copy engines can generate page faults for addresses that are not mapped into the page tables. The memory partition unit 1000 can then service the page faults, mapping the addresses into the page table, after which the copy engine can perform the transfer. In a conventional system, memory is pinned (e.g., non-pageable) for multiple copy engine operations between multiple processors, substantially reducing the available memory. With hardware page faulting, addresses can be passed to the copy engines without worrying if the memory pages are resident, and the copy process is transparent.

Data from the memory 804 or other system memory may be fetched by the memory partition unit 1000 and stored in the level two cache 1004, which is located on-chip and is shared between the various general processing cluster 900 modules. As shown, each memory partition unit 1000 includes a portion of the level two cache 1004 associated with a corresponding memory 804 device. Lower level caches may then be implemented in various units within the general processing cluster 900 modules. For example, each of the streaming multiprocessor 1100 modules may implement an L1 cache. The L1 cache is private memory that is dedicated to a particular streaming multiprocessor 1100. Data from the level two cache 1004 may be fetched and stored in each of the L1 caches for processing in the functional units of the streaming multiprocessor 1100 modules. The level two cache 1004 is coupled to the memory interface 1006 and the crossbar 818.

The raster operations unit 1002 performs graphics raster operations related to pixel color, such as color compression, pixel blending, and the like. The raster operations unit 1002 also implements depth testing in conjunction with the raster engine 908, receiving a depth for a sample location associated with a pixel fragment from the culling engine of the raster engine 908. The depth is tested against a corresponding depth in a depth buffer for a sample location associated with the fragment. If the fragment passes the depth test for the sample location, then the raster operations unit 1002 updates the depth buffer and transmits a result of the depth test to the raster engine 908. It will be appreciated that the number of partition memory partition unit 1000 modules may be different than the number of general processing cluster 900 modules and, therefore, each raster operations unit 1002 may be coupled to each of the general processing cluster 900 modules. The raster operations unit 1002 tracks packets received from the different general processing cluster 900 modules and determines which general processing cluster 900 that a result generated by the raster operations unit 1002 is routed to through the crossbar 818. Although the raster operations unit 1002 is included within the memory partition unit 1000 in FIG. 10, in other embodiment, the raster operations unit 1002 may be outside of the memory partition unit 1000. For example, the raster operations unit 1002 may reside in the general processing cluster 900 or another unit.

Figure 11:
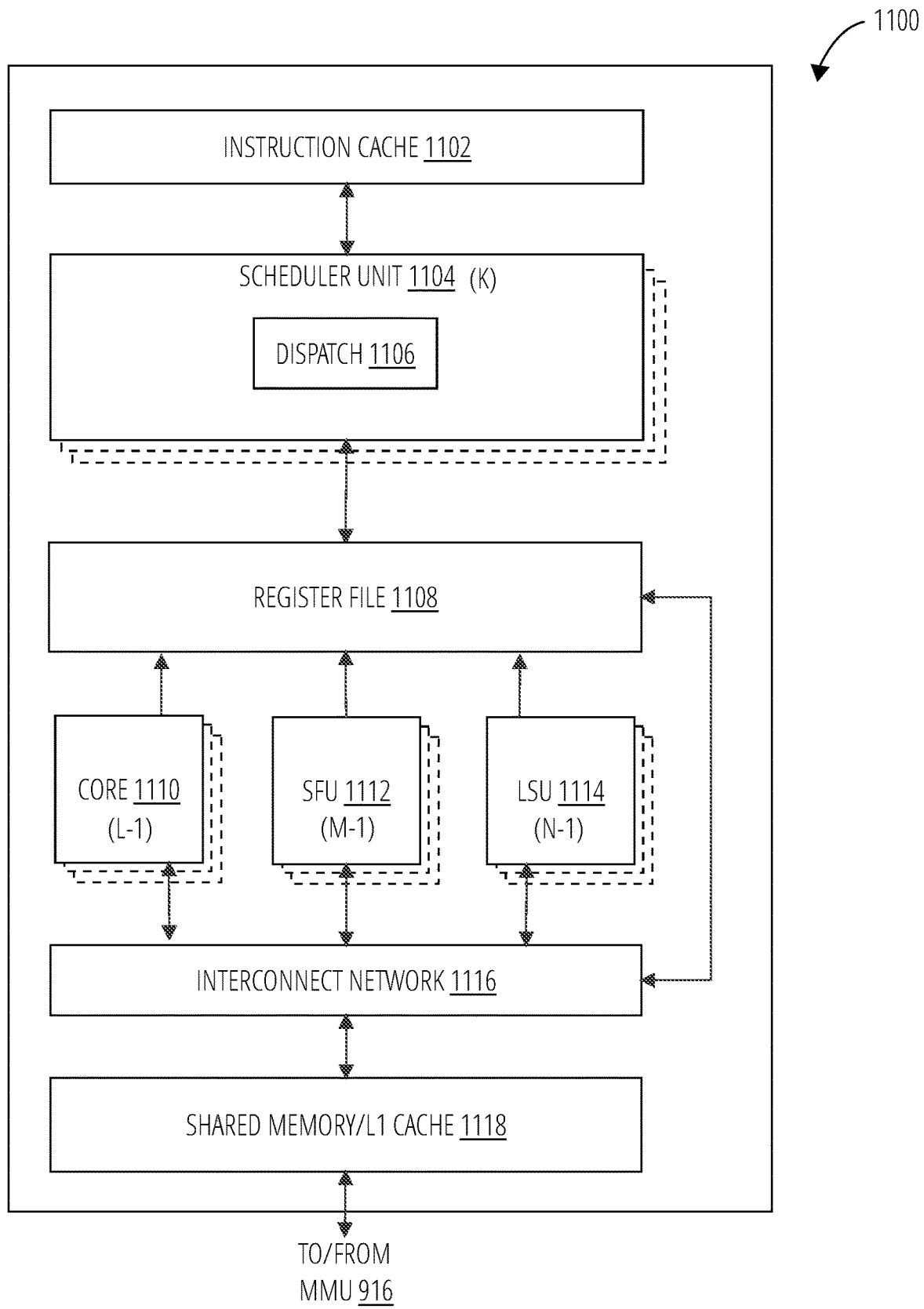
FIG. 11 depicts a streaming multiprocessor 1100 in accordance with one embodiment.

FIG. 11 illustrates the streaming multiprocessor 1100 of FIG. 9, in accordance with an embodiment. As shown in FIG. 11, the streaming multiprocessor 1100 includes an instruction cache 1102, one or more scheduler unit 1104 modules (e.g., such as scheduler unit 812), a register file 1108, one or more processing core 1110 modules, one or more special function unit 1112 modules, one or more load/store unit 1114 modules, an interconnect network 1116, and a shared memory/L1 cache 1118.

As described above, the work distribution unit 814 dispatches tasks for execution on the general processing cluster 900 modules of the parallel processing unit 800. The tasks are allocated to a particular data processing cluster 906 within a general processing cluster 900 and, if the task is associated with a shader program, the task may be allocated to a streaming multiprocessor 1100. The scheduler unit 812 receives the tasks from the work distribution unit 814 and manages instruction scheduling for one or more thread blocks assigned to the streaming multiprocessor 1100. The scheduler unit 1104 schedules thread blocks for execution as warps of parallel threads, where each thread block is allocated at least one warp. In an embodiment, each warp executes 32 threads. The scheduler unit 1104 may manage a plurality of different thread blocks, allocating the warps to the different thread blocks and then dispatching instructions from the plurality of different cooperative groups to the various functional units (e.g., core 1110 modules, special function unit 1112 modules, and load/store unit 1114 modules) during each clock cycle.

Cooperative Groups is a programming model for organizing groups of communicating threads that allows developers to express the granularity at which threads are communicating, enabling the expression of richer, more efficient parallel decompositions. Cooperative launch APIs support synchronization amongst thread blocks for the execution of parallel algorithms. Conventional programming models provide a single, simple construct for synchronizing cooperating threads: a barrier across all threads of a thread block (e.g., the syncthreads( ) function). However, programmers would often like to define groups of threads at smaller than thread block granularities and synchronize within the defined groups to enable greater performance, design flexibility, and software reuse in the form of collective group-wide function interfaces.

Cooperative Groups enables programmers to define groups of threads explicitly at sub-block (e.g., as small as a single thread) and multi-block granularities, and to perform collective operations such as synchronization on the threads in a cooperative group. The programming model supports clean composition across software boundaries, so that libraries and utility functions can synchronize safely within their local context without having to make assumptions about convergence. Cooperative Groups primitives enable new patterns of cooperative parallelism, including producer-consumer parallelism, opportunistic parallelism, and global synchronization across an entire grid of thread blocks.

A dispatch 1106 unit is configured within the scheduler unit 1104 to transmit instructions to one or more of the functional units. In one embodiment, the scheduler unit 1104 includes two dispatch 1106 units that enable two different instructions from the same warp to be dispatched during each clock cycle. In alternative embodiments, each scheduler unit 1104 may include a single dispatch 1106 unit or additional dispatch 1106 units.

Each streaming multiprocessor 1100 includes a register file 1108 that provides a set of registers for the functional units of the streaming multiprocessor 1100. In an embodiment, the register file 1108 is divided between each of the functional units such that each functional unit is allocated a dedicated portion of the register file 1108. In another embodiment, the register file 1108 is divided between the different warps being executed by the streaming multiprocessor 1100. The register file 1108 provides temporary storage for operands connected to the data paths of the functional units.

Each streaming multiprocessor 1100 comprises L processing core 1110 modules. In an embodiment, the streaming multiprocessor 1100 includes a large number (e.g., 128, etc.) of distinct processing core 1110 modules. Each core 1110 may include a fully-pipelined, single-precision, double-precision, and/or mixed precision processing unit that includes a floating point arithmetic logic unit and an integer arithmetic logic unit. In an embodiment, the floating point arithmetic logic units implement the IEEE 754-2008 standard for floating point arithmetic. In an embodiment, the core 1110 modules include 64 single-precision (32-bit) floating point cores, 64 integer cores, 32 double-precision (64-bit) floating point cores, and 8 tensor cores.

Tensor cores configured to perform matrix operations, and, in an embodiment, one or more tensor cores are included in the core 1110 modules. In particular, the tensor cores are configured to perform deep learning matrix arithmetic, such as convolution operations for neural network training and inferencing. In an embodiment, each tensor core operates on a 4×4 matrix and performs a matrix multiply and accumulate operation $D=A'B+C$, where A, B, C, and D are 4×4 matrices.

In an embodiment, the matrix multiply inputs A and B are 16-bit floating point matrices, while the accumulation matrices C and D may be 16-bit floating point or 32-bit floating point matrices. Tensor Cores operate on 16-bit floating point input data with 32-bit floating point accumulation. The 16-bit floating point multiply requires 64 operations and results in a full precision product that is then accumulated using 32-bit floating point addition with the other intermediate products for a 4×4×4 matrix multiply. In practice, Tensor Cores are used to perform much larger two-dimensional or higher dimensional matrix operations, built up from these smaller elements. An API, such as CUDA 9 C++ API, exposes specialized matrix load, matrix multiply and accumulate, and matrix store operations to efficiently use Tensor Cores from a CUDA-C++ program. At the CUDA level, the warp-level interface assumes 16×16 size matrices spanning all 32 threads of the warp.

Each streaming multiprocessor 1100 also comprises M special function unit 1112 modules that perform special functions (e.g., attribute evaluation, reciprocal square root, and the like). In an embodiment, the special function unit 1112 modules may include a tree traversal unit configured to traverse a hierarchical tree data structure. In an embodiment, the special function unit 1112 modules may include texture unit configured to perform texture map filtering operations. In an embodiment, the texture units are configured to load texture maps (e.g., a 2D array of texels) from the memory 804 and sample the texture maps to produce sampled texture values for use in shader programs executed by the streaming multiprocessor 1100. In an embodiment, the texture maps are stored in the shared memory/L1 cache 1118. The texture units implement texture operations such as filtering operations using mip-maps (e.g., texture maps of varying levels of detail). In an embodiment, each streaming multiprocessor 1100 includes two texture units.

Each streaming multiprocessor 1100 also comprises N load/store unit 1114 modules that implement load and store operations between the shared memory/L1 cache 1118 and the register file 1108. Each streaming multiprocessor 1100 includes an interconnect network 1116 that connects each of the functional units to the register file 1108 and the load/store unit 1114 to the register file 1108 and shared memory/L1 cache 1118. In an embodiment, the interconnect network 1116 is a crossbar that can be configured to connect any of the functional units to any of the registers in the register file 1108 and connect the load/store unit 1114 modules to the register file 1108 and memory locations in shared memory/L1 cache 1118.

The shared memory/L1 cache 1118 is an array of on-chip memory that allows for data storage and communication between the streaming multiprocessor 1100 and the primitive engine 912 and between threads in the streaming multiprocessor 1100. In an embodiment, the shared memory/L1 cache 1118 comprises 128 KB of storage capacity and is in the path from the streaming multiprocessor 1100 to the memory partition unit 1000. The shared memory/L1 cache 1118 can be used to cache reads and writes. One or more of the shared memory/L1 cache 1118, level two cache 1004, and memory 804 are backing stores.

Combining data cache and shared memory functionality into a single memory block provides the best overall performance for both types of memory accesses. The capacity is usable as a cache by programs that do not use shared memory. For example, if shared memory is configured to use half of the capacity, texture and load/store operations can use the remaining capacity. Integration within the shared memory/L1 cache 1118 enables the shared memory/L1 cache 1118 to function as a high-throughput conduit for streaming data while simultaneously providing high-bandwidth and low-latency access to frequently reused data.

When configured for general purpose parallel computation, a simpler configuration can be used compared with graphics processing. Specifically, the fixed function graphics processing units shown in FIG. 8, are bypassed, creating a much simpler programming model. In the general purpose parallel computation configuration, the work distribution unit 814 assigns and distributes blocks of threads directly to the data processing cluster 906 modules. The threads in a block execute the same program, using a unique thread ID in the calculation to ensure each thread generates unique results, using the streaming multiprocessor 1100 to execute the program and perform calculations, shared memory/L1 cache 1118 to communicate between threads, and the load/store unit 1114 to read and write global memory through the shared memory/L1 cache 1118 and the memory partition unit 1000. When configured for general purpose parallel computation, the streaming multiprocessor 1100 can also write commands that the scheduler unit 812 can use to launch new work on the data processing cluster 906 modules.

The parallel processing unit 800 may be included in a desktop computer, a laptop computer, a tablet computer, servers, supercomputers, a smart-phone (e.g., a wireless, hand-held device), personal digital assistant (PDA), a digital camera, a vehicle, a head mounted display, a hand-held electronic device, and the like. In an embodiment, the parallel processing unit 800 is embodied on a single semiconductor substrate. In another embodiment, the parallel processing unit 800 is included in a system-on-a-chip (SoC) along with one or more other devices such as additional parallel processing unit 800 modules, the memory 804, a reduced instruction set computer (RISC) CPU, a memory management unit (MMU), a digital-to-analog converter (DAC), and the like.

In an embodiment, the parallel processing unit 800 may be included on a graphics card that includes one or more memory devices. The graphics card may be configured to interface with a PCIe slot on a motherboard of a desktop computer. In yet another embodiment, the parallel processing unit 800 may be an integrated graphics processing unit (iGPU) or parallel processor included in the chipset of the motherboard.

Exemplary Computing System

Systems with multiple GPUs and CPUs are used in a variety of industries as developers expose and leverage more parallelism in applications such as artificial intelligence computing. High-performance GPU-accelerated systems with tens to many thousands of compute nodes are deployed in data centers, research facilities, and supercomputers to solve ever larger problems. As the number of processing devices within the high-performance systems increases, the communication and data transfer mechanisms need to scale to support the increased bandwidth.

Figure 12:
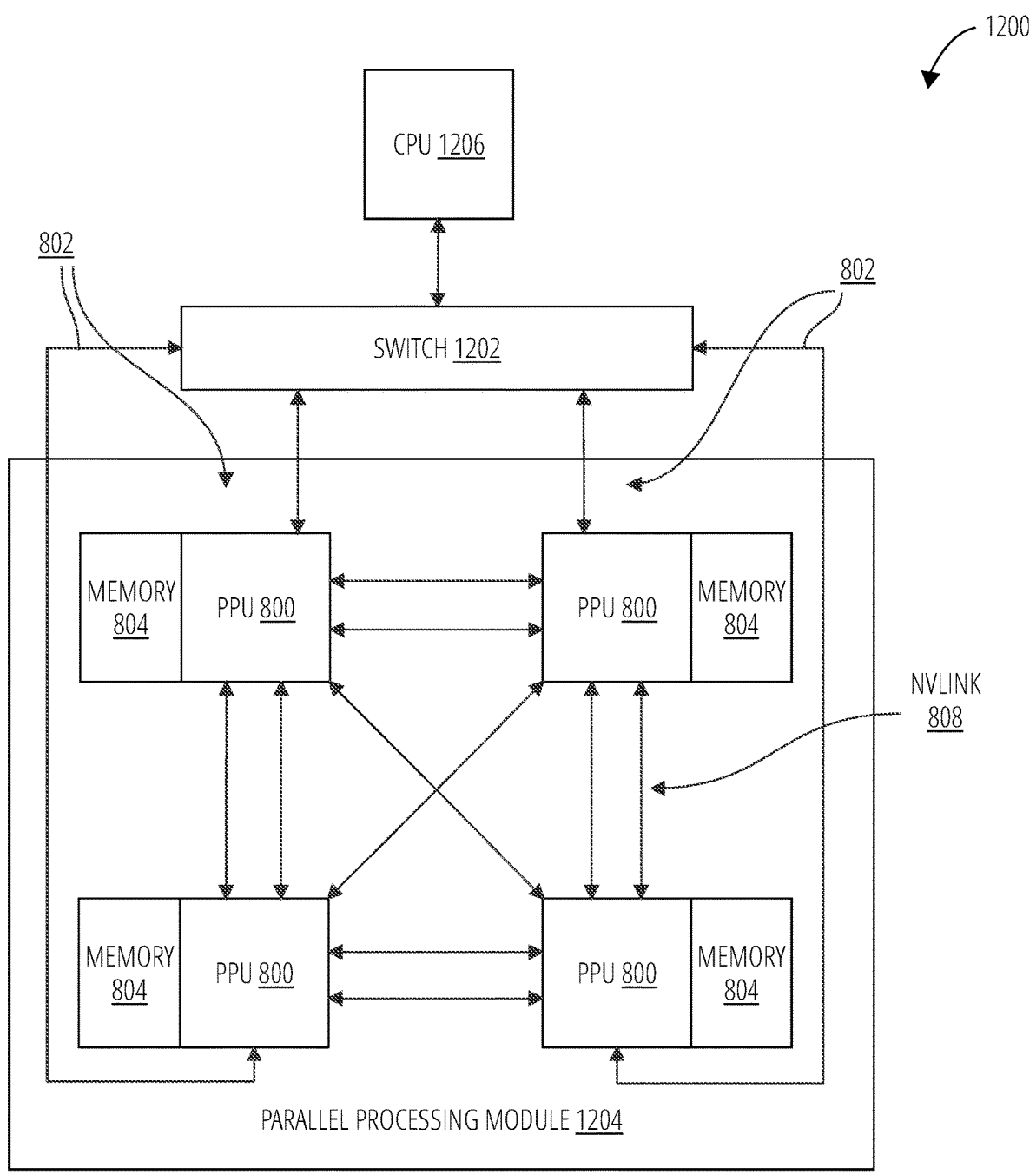
FIG. 12 depicts a processing system 1200 in accordance with one embodiment.

FIG. 12 is a conceptual diagram of a processing system 1200 implemented using the parallel processing unit 800 of FIG. 8, in accordance with an embodiment. The processing system 1200 includes a central processing unit 1206, switch 1202, and multiple parallel processing unit 800 modules each and respective memory 804 modules. The NVLink 808 provides high-speed communication links between each of the parallel processing unit 800 modules. Although a particular number of NVLink 808 and interconnect 802 connections are illustrated in FIG. 12, the number of connections to each parallel processing unit 800 and the central processing unit 1206 may vary. The switch 1202 interfaces between the interconnect 802 and the central processing unit 1206. The parallel processing unit 800 modules, memory 804 modules, and NVLink 808 connections may be situated on a single semiconductor platform to form a parallel processing module 1204. In an embodiment, the switch 1202 supports two or more protocols to interface between various different connections and/or links.

In another embodiment (not shown), the NVLink 808 provides one or more high-speed communication links between each of the parallel processing unit 800 modules and the central processing unit 1206 and the switch 1202 interfaces between the interconnect 802 and each of the parallel processing unit 800 modules. The parallel processing unit 800 modules, memory 804 modules, and interconnect 802 may be situated on a single semiconductor platform to form a parallel processing module 1204. In yet another embodiment (not shown), the interconnect 802 provides one or more communication links between each of the parallel processing unit 800 modules and the central processing unit 1206 and the switch 1202 interfaces between each of the parallel processing unit 800 modules using the NVLink 808 to provide one or more high-speed communication links between the parallel processing unit 800 modules. In another embodiment (not shown), the NVLink 808 provides one or more high-speed communication links between the parallel processing unit 800 modules and the central processing unit 1206 through the switch 1202. In yet another embodiment (not shown), the interconnect 802 provides one or more communication links between each of the parallel processing unit 800 modules directly. One or more of the NVLink 808 high-speed communication links may be implemented as a physical NVLink interconnect or either an on-chip or on-die interconnect using the same protocol as the NVLink 808.

In the context of the present description, a single semiconductor platform may refer to a sole unitary semiconductor-based integrated circuit fabricated on a die or chip. It should be noted that the term single semiconductor platform may also refer to multi-chip modules with increased connectivity which simulate on-chip operation and make substantial improvements over utilizing a conventional bus implementation. Of course, the various circuits or devices may also be situated separately or in various combinations of semiconductor platforms per the desires of the user. Alternately, the parallel processing module 1204 may be implemented as a circuit board substrate and each of the parallel processing unit 800 modules and/or memory 804 modules may be packaged devices. In an embodiment, the central processing unit 1206, switch 1202, and the parallel processing module 1204 are situated on a single semiconductor platform.

In an embodiment, the signaling rate of each NVLink 808 is 20 to 25 Gigabits/second and each parallel processing unit 800 includes six NVLink 808 interfaces (as shown in FIG. 12, five NVLink 808 interfaces are included for each parallel processing unit 800). Each NVLink 808 provides a data transfer rate of 25 Gigabytes/second in each direction, with six links providing 300 Gigabytes/second. The NVLink 808 can be used exclusively for PPU-to-PPU communication as shown in FIG. 12, or some combination of PPU-to-PPU and PPU-to-CPU, when the central processing unit 1206 also includes one or more NVLink 808 interfaces.

In an embodiment, the NVLink 808 allows direct load/store/atomic access from the central processing unit 1206 to each parallel processing unit 800 module's memory 804. In an embodiment, the NVLink 808 supports coherency operations, allowing data read from the memory 804 modules to be stored in the cache hierarchy of the central processing unit 1206, reducing cache access latency for the central processing unit 1206. In an embodiment, the NVLink 808 includes support for Address Translation Services (ATS), allowing the parallel processing unit 800 to directly access page tables within the central processing unit 1206. One or more of the NVLink 808 may also be configured to operate in a low-power mode.

Figure 13:
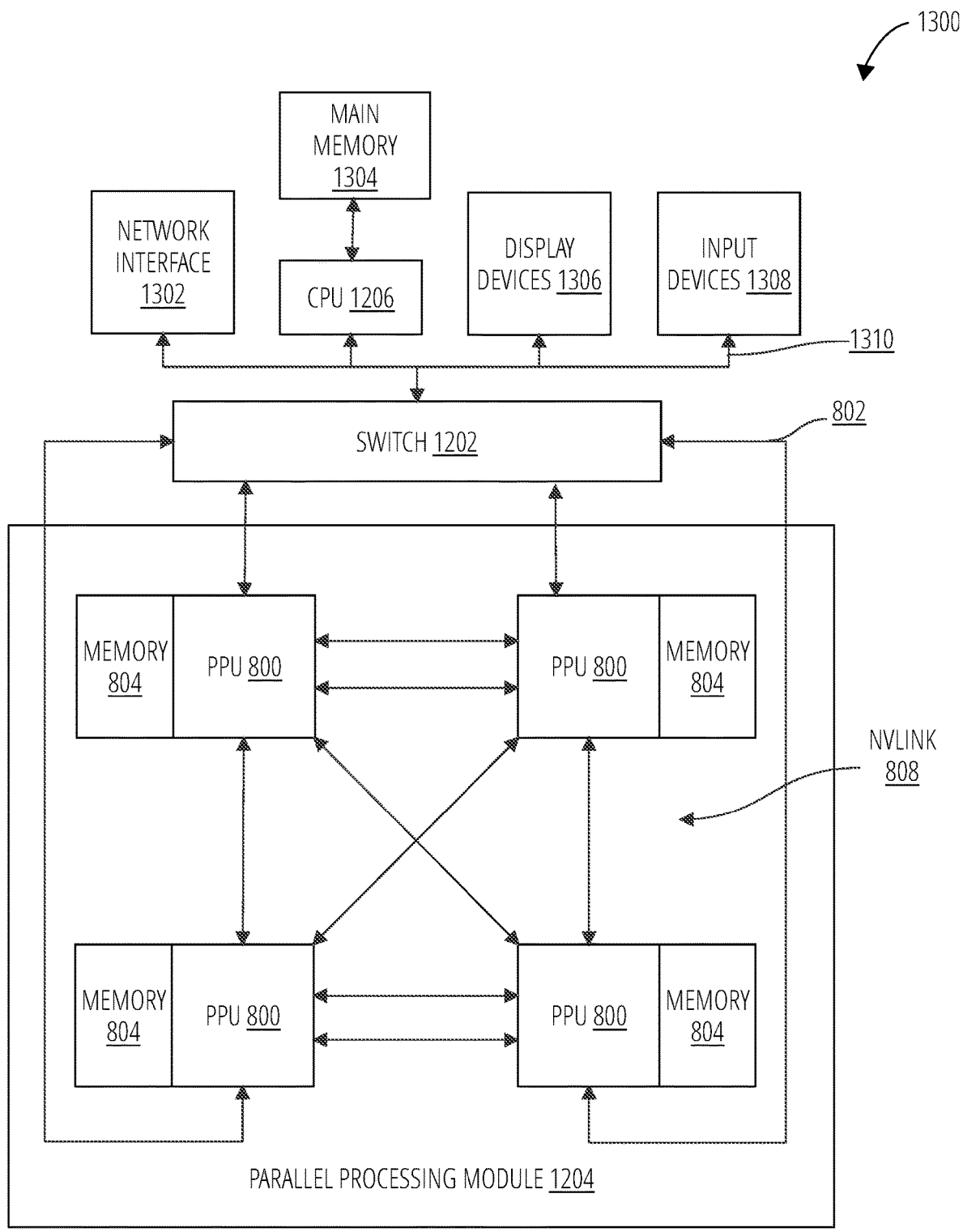
FIG. 13 depicts an exemplary processing system 1300 in accordance with another embodiment.

FIG. 13 depicts an exemplary processing system 1300 in which the various architecture and/or functionality of the various previous embodiments may be implemented. As shown, an exemplary processing system 1300 is provided including at least one central processing unit 1206 that is connected to a communications bus 1310. The communication communications bus 1310 may be implemented using any suitable protocol, such as PCI (Peripheral Component Interconnect), PCI-Express, AGP (Accelerated Graphics Port), HyperTransport, or any other bus or point-to-point communication protocol(s). The exemplary processing system 1300 also includes a main memory 1304. Control logic (software) and data are stored in the main memory 1304 which may take the form of random access memory (RAM).

The exemplary processing system 1300 also includes input devices 1308, the parallel processing module 1204, and display devices 1306, e.g. a conventional CRT (cathode ray tube), LCD (liquid crystal display), LED (light emitting diode), plasma display or the like. User input may be received from the input devices 1308, e.g., keyboard, mouse, touchpad, microphone, and the like. Each of the foregoing modules and/or devices may even be situated on a single semiconductor platform to form the exemplary processing system 1300. Alternately, the various modules may also be situated separately or in various combinations of semiconductor platforms per the desires of the user.

Further, the exemplary processing system 1300 may be coupled to a network (e.g., a telecommunications network, local area network (LAN), wireless network, wide area network (WAN) such as the Internet, peer-to-peer network, cable network, or the like) through a network interface 1302 for communication purposes.

The exemplary processing system 1300 may also include a secondary storage (not shown). The secondary storage includes, for example, a hard disk drive and/or a removable storage drive, representing a floppy disk drive, a magnetic tape drive, a compact disk drive, digital versatile disk (DVD) drive, recording device, universal serial bus (USB) flash memory. The removable storage drive reads from and/or writes to a removable storage unit in a well-known manner.

Computer programs, or computer control logic algorithms, may be stored in the main memory 1304 and/or the secondary storage. Such computer programs, when executed, enable the exemplary processing system 1300 to perform various functions. The main memory 1304, the storage, and/or any other storage are possible examples of computer-readable media.

The architecture and/or functionality of the various previous figures may be implemented in the context of a general computer system, a circuit board system, a game console system dedicated for entertainment purposes, an application-specific system, and/or any other desired system. For example, the exemplary processing system 1300 may take the form of a desktop computer, a laptop computer, a tablet computer, servers, supercomputers, a smart-phone (e.g., a wireless, hand-held device), personal digital assistant (PDA), a digital camera, a vehicle, a head mounted display, a hand-held electronic device, a mobile phone device, a television, workstation, game consoles, embedded system, and/or any other type of logic.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

Graphics Processing Pipeline

FIG. 13 is a conceptual diagram of a graphics processing pipeline 1400 implemented by the parallel processing unit 800 of FIG. 8, in accordance with an embodiment. In an embodiment, the parallel processing unit 800 comprises a graphics processing unit (GPU). The parallel processing unit 800 is configured to receive commands that specify shader programs for processing graphics data. Graphics data may be defined as a set of primitives such as points, lines, triangles, quads, triangle strips, and the like. Typically, a primitive includes data that specifies a number of vertices for the primitive (e.g., in a model-space coordinate system) as well as attributes associated with each vertex of the primitive. The parallel processing unit 800 can be configured to process the graphics primitives to generate a frame buffer (e.g., pixel data for each of the pixels of the display).

An application writes model data for a scene (e.g., a collection of vertices and attributes) to a memory such as a system memory or memory 804. The model data defines each of the objects that may be visible on a display. The application then makes an API call to the driver kernel that requests the model data to be rendered and displayed. The driver kernel reads the model data and writes commands to the one or more streams to perform operations to process the model data. The commands may reference different shader programs to be implemented on the streaming multiprocessor 1100 modules of the parallel processing unit 800 including one or more of a vertex shader, hull shader, domain shader, geometry shader, and a pixel shader. For example, one or more of the streaming multiprocessor 1100 modules may be configured to execute a vertex shader program that processes a number of vertices defined by the model data. In an embodiment, the different streaming multiprocessor 1100 modules may be configured to execute different shader programs concurrently. For example, a first subset of streaming multiprocessor 1100 modules may be configured to execute a vertex shader program while a second subset of streaming multiprocessor 1100 modules may be configured to execute a pixel shader program. The first subset of streaming multiprocessor 1100 modules processes vertex data to produce processed vertex data and writes the processed vertex data to the level two cache 1004 and/or the memory 804. After the processed vertex data is rasterized (e.g., transformed from three-dimensional data into two-dimensional data in screen space) to produce fragment data, the second subset of streaming multiprocessor 1100 modules executes a pixel shader to produce processed fragment data, which is then blended with other processed fragment data and written to the frame buffer in memory 804. The vertex shader program and pixel shader program may execute concurrently, processing different data from the same scene in a pipelined fashion until all of the model data for the scene has been rendered to the frame buffer. Then, the contents of the frame buffer are transmitted to a display controller for display on a display device.

The graphics processing pipeline 1400 is an abstract flow diagram of the processing steps implemented to generate 2D computer-generated images from 3D geometry data. As is well-known, pipeline architectures may perform long latency operations more efficiently by splitting up the operation into a plurality of stages, where the output of each stage is coupled to the input of the next successive stage. Thus, the graphics processing pipeline 1400 receives input data 601 that is transmitted from one stage to the next stage of the graphics processing pipeline 1400 to generate output data 1404. In an embodiment, the graphics processing pipeline 1400 may represent a graphics processing pipeline defined by the OpenGL® API. As an option, the graphics processing pipeline 1400 may be implemented in the context of the functionality and architecture of the previous Figures and/or any subsequent Figure(s).

Figure 14:
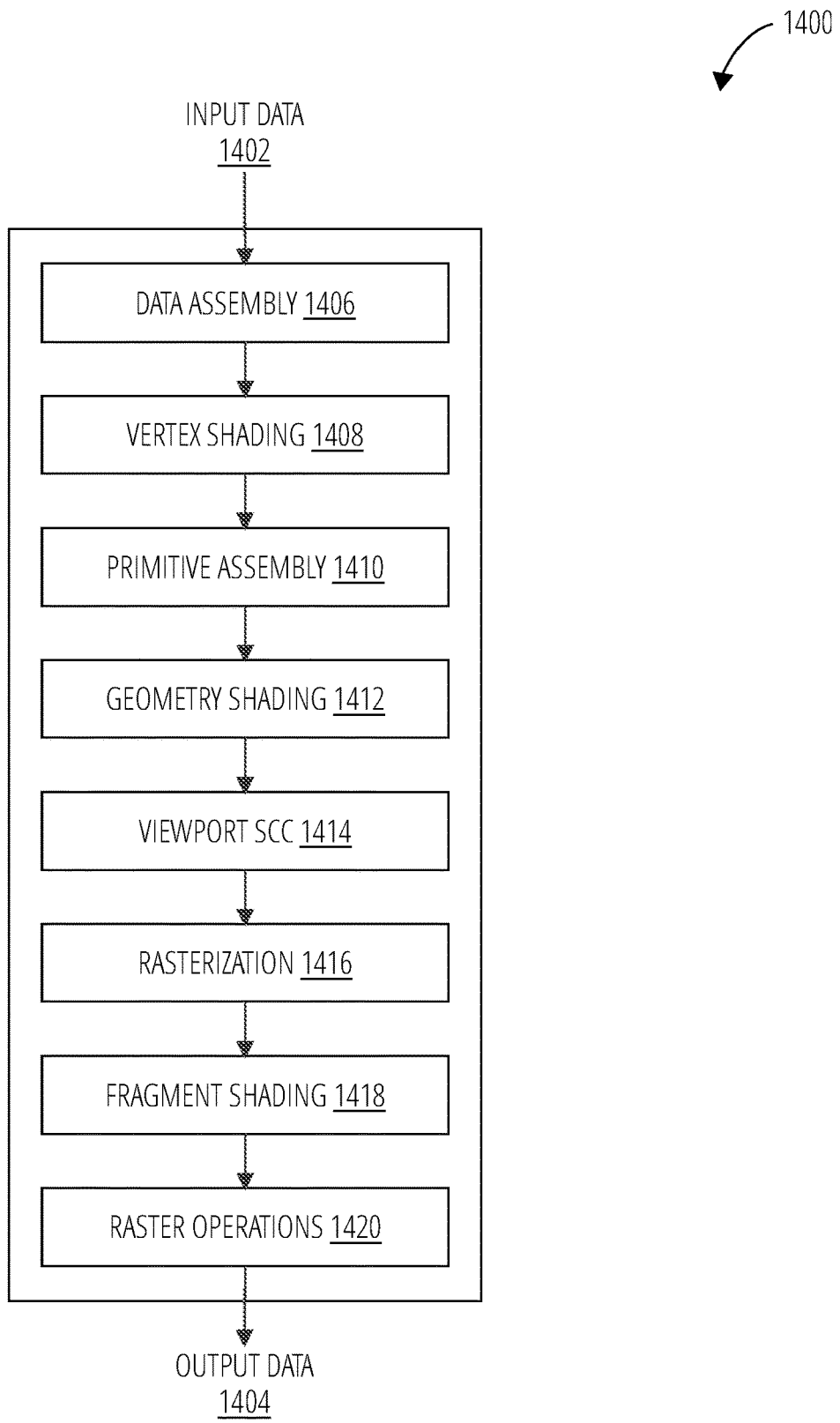
FIG. 14 depicts a graphics processing pipeline 1400 in accordance with one embodiment.

As shown in FIG. 14, the graphics processing pipeline 1400 comprises a pipeline architecture that includes a number of stages. The stages include, but are not limited to, a data assembly 1406 stage, a vertex shading 1408 stage, a primitive assembly 1410 stage, a geometry shading 1412 stage, a viewport SCC 1414 stage, a rasterization 1416 stage, a fragment shading 1418 stage, and a raster operations 1420 stage. In an embodiment, the input data 1402 comprises commands that configure the processing units to implement the stages of the graphics processing pipeline 1400 and geometric primitives (e.g., points, lines, triangles, quads, triangle strips or fans, etc.) to be processed by the stages. The output data 1404 may comprise pixel data (e.g., color data) that is copied into a frame buffer or other type of surface data structure in a memory.

The data assembly 1406 stage receives the input data 1402 that specifies vertex data for high-order surfaces, primitives, or the like. The data assembly 1406 stage collects the vertex data in a temporary storage or queue, such as by receiving a command from the host processor that includes a pointer to a buffer in memory and reading the vertex data from the buffer. The vertex data is then transmitted to the vertex shading 1408 stage for processing.

The vertex shading 1408 stage processes vertex data by performing a set of operations (e.g., a vertex shader or a program) once for each of the vertices. Vertices may be, e.g., specified as a 4-coordinate vector (e.g., <x, y, z, w>) associated with one or more vertex attributes (e.g., color, texture coordinates, surface normal, etc.). The vertex shading 1408 stage may manipulate individual vertex attributes such as position, color, texture coordinates, and the like. In other words, the vertex shading 1408 stage performs operations on the vertex coordinates or other vertex attributes associated with a vertex. Such operations commonly including lighting operations (e.g., modifying color attributes for a vertex) and transformation operations (e.g., modifying the coordinate space for a vertex). For example, vertices may be specified using coordinates in an object-coordinate space, which are transformed by multiplying the coordinates by a matrix that translates the coordinates from the object-coordinate space into a world space or a normalized-device-coordinate (NCD) space. The vertex shading 1408 stage generates transformed vertex data that is transmitted to the primitive assembly 1410 stage.

The primitive assembly 1410 stage collects vertices output by the vertex shading 1408 stage and groups the vertices into geometric primitives for processing by the geometry shading 1412 stage. For example, the primitive assembly 1410 stage may be configured to group every three consecutive vertices as a geometric primitive (e.g., a triangle) for transmission to the geometry shading 1412 stage. In some embodiments, specific vertices may be reused for consecutive geometric primitives (e.g., two consecutive triangles in a triangle strip may share two vertices). The primitive assembly 1410 stage transmits geometric primitives (e.g., a collection of associated vertices) to the geometry shading 1412 stage.

The geometry shading 1412 stage processes geometric primitives by performing a set of operations (e.g., a geometry shader or program) on the geometric primitives. Tessellation operations may generate one or more geometric primitives from each geometric primitive. In other words, the geometry shading 1412 stage may subdivide each geometric primitive into a finer mesh of two or more geometric primitives for processing by the rest of the graphics processing pipeline 1400. The geometry shading 1412 stage transmits geometric primitives to the viewport SCC 1414 stage.

In an embodiment, the graphics processing pipeline 1400 may operate within a streaming multiprocessor and the vertex shading 1408 stage, the primitive assembly 1410 stage, the geometry shading 1412 stage, the fragment shading 1418 stage, and/or hardware/software associated therewith, may sequentially perform processing operations. Once the sequential processing operations are complete, in an embodiment, the viewport SCC 1414 stage may utilize the data. In an embodiment, primitive data processed by one or more of the stages in the graphics processing pipeline 1400 may be written to a cache (e.g. L1 cache, a vertex cache, etc.). In this case, in an embodiment, the viewport SCC 1414 stage may access the data in the cache. In an embodiment, the viewport SCC 1414 stage and the rasterization 1416 stage are implemented as fixed function circuitry.

The viewport SCC 1414 stage performs viewport scaling, culling, and clipping of the geometric primitives. Each surface being rendered to is associated with an abstract camera position. The camera position represents a location of a viewer looking at the scene and defines a viewing frustum that encloses the objects of the scene. The viewing frustum may include a viewing plane, a rear plane, and four clipping planes. Any geometric primitive entirely outside of the viewing frustum may be culled (e.g., discarded) because the geometric primitive will not contribute to the final rendered scene. Any geometric primitive that is partially inside the viewing frustum and partially outside the viewing frustum may be clipped (e.g., transformed into a new geometric primitive that is enclosed within the viewing frustum. Furthermore, geometric primitives may each be scaled based on a depth of the viewing frustum. All potentially visible geometric primitives are then transmitted to the rasterization 1416 stage.

The rasterization 1416 stage converts the 3D geometric primitives into 2D fragments (e.g. capable of being utilized for display, etc.). The rasterization 1416 stage may be configured to utilize the vertices of the geometric primitives to setup a set of plane equations from which various attributes can be interpolated. The rasterization 1416 stage may also compute a coverage mask for a plurality of pixels that indicates whether one or more sample locations for the pixel intercept the geometric primitive. In an embodiment, z-testing may also be performed to determine if the geometric primitive is occluded by other geometric primitives that have already been rasterized. The rasterization 1416 stage generates fragment data (e.g., interpolated vertex attributes associated with a particular sample location for each covered pixel) that are transmitted to the fragment shading 1418 stage.

The fragment shading 1418 stage processes fragment data by performing a set of operations (e.g., a fragment shader or a program) on each of the fragments. The fragment shading 1418 stage may generate pixel data (e.g., color values) for the fragment such as by performing lighting operations or sampling texture maps using interpolated texture coordinates for the fragment. The fragment shading 1418 stage generates pixel data that is transmitted to the raster operations 1420 stage.

The raster operations 1420 stage may perform various operations on the pixel data such as performing alpha tests, stencil tests, and blending the pixel data with other pixel data corresponding to other fragments associated with the pixel. When the raster operations 1420 stage has finished processing the pixel data (e.g., the output data 1404), the pixel data may be written to a render target such as a frame buffer, a color buffer, or the like.

It will be appreciated that one or more additional stages may be included in the graphics processing pipeline 1400 in addition to or in lieu of one or more of the stages described above. Various implementations of the abstract graphics processing pipeline may implement different stages. Furthermore, one or more of the stages described above may be excluded from the graphics processing pipeline in some embodiments (such as the geometry shading 1412 stage). Other types of graphics processing pipelines are contemplated as being within the scope of the present disclosure. Furthermore, any of the stages of the graphics processing pipeline 1400 may be implemented by one or more dedicated hardware units within a graphics processor such as parallel processing unit 800. Other stages of the graphics processing pipeline 1400 may be implemented by programmable hardware units such as the streaming multiprocessor 1100 of the parallel processing unit 800.

The graphics processing pipeline 1400 may be implemented via an application executed by a host processor, such as a CPU. In an embodiment, a device driver may implement an application programming interface (API) that defines various functions that can be utilized by an application in order to generate graphical data for display. The device driver is a software program that includes a plurality of instructions that control the operation of the parallel processing unit 800. The API provides an abstraction for a programmer that lets a programmer utilize specialized graphics hardware, such as the parallel processing unit 800, to generate the graphical data without requiring the programmer to utilize the specific instruction set for the parallel processing unit 800. The application may include an API call that is routed to the device driver for the parallel processing unit 800. The device driver interprets the API call and performs various operations to respond to the API call. In some instances, the device driver may perform operations by executing instructions on the CPU. In other instances, the device driver may perform operations, at least in part, by launching operations on the parallel processing unit 800 utilizing an input/output interface between the CPU and the parallel processing unit 800. In an embodiment, the device driver is configured to implement the graphics processing pipeline 1400 utilizing the hardware of the parallel processing unit 800.

Various programs may be executed within the parallel processing unit 800 in order to implement the various stages of the graphics processing pipeline 1400. For example, the device driver may launch a kernel on the parallel processing unit 800 to perform the vertex shading 1408 stage on one streaming multiprocessor 1100 (or multiple streaming multiprocessor 1100 modules). The device driver (or the initial kernel executed by the parallel processing unit 800) may also launch other kernels on the parallel processing unit 800 to perform other stages of the graphics processing pipeline 1400, such as the geometry shading 1412 stage and the fragment shading 1418 stage. In addition, some of the stages of the graphics processing pipeline 1400 may be implemented on fixed unit hardware such as a rasterizer or a data assembler implemented within the parallel processing unit 800. It will be appreciated that results from one kernel may be processed by one or more intervening fixed function hardware units before being processed by a subsequent kernel on a streaming multiprocessor 1100.

Various functional operations described herein may be implemented in logic that is referred to using a noun or noun phrase reflecting said operation or function. For example, an association operation may be carried out by an "associator" or "correlator". Likewise, switching may be carried out by a "switch", selection by a "selector", and so on.

Within this disclosure, different entities (which may variously be referred to as "units," "circuits," other components, etc.) may be described or claimed as "configured" to perform one or more tasks or operations. This formulation—[entity] configured to [perform one or more tasks]—is used herein to refer to structure (i.e., something physical, such as an electronic circuit). More specifically, this formulation is used to indicate that this structure is arranged to perform the one or more tasks during operation. A structure can be said to be "configured to" perform some task even if the structure is not currently being operated. A "credit distribution circuit configured to distribute credits to a plurality of processor cores" is intended to cover, for example, an integrated circuit that has circuitry that performs this function during operation, even if the integrated circuit in question is not currently being used (e.g., a power supply is not connected to it). Thus, an entity described or recited as "configured to" perform some task refers to something physical, such as a device, circuit, memory storing program instructions executable to implement the task, etc. This phrase is not used herein to refer to something intangible.

The term "configured to" is not intended to mean "configurable to." An unprogrammed FPGA, for example, would not be considered to be "configured to" perform some specific function, although it may be "configurable to" perform that function after programming.

Reciting in the appended claims that a structure is "configured to" perform one or more tasks is expressly intended not to invoke 35 U.S.C. § 112(f) for that claim element. Accordingly, claims in this application that do not otherwise include the "means for" [performing a function] construct should not be interpreted under 35 U.S.C § 112(f).

As used herein, the term "based on" is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor that is used to determine A or that affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on."

As used herein, the phrase "in response to" describes one or more factors that trigger an effect. This phrase does not foreclose the possibility that additional factors may affect or otherwise trigger the effect. That is, an effect may be solely in response to those factors, or may be in response to the specified factors as well as other, unspecified factors. Consider the phrase "perform A in response to B." This phrase specifies that B is a factor that triggers the performance of A. This phrase does not foreclose that performing A may also be in response to some other factor, such as C. This phrase is also intended to cover an embodiment in which A is performed solely in response to B.

As used herein, the terms "first," "second," etc. are used as labels for nouns that they precede, and do not imply any type of ordering (e.g., spatial, temporal, logical, etc.), unless stated otherwise. For example, in a register file having eight registers, the terms "first register" and "second register" can be used to refer to any two of the eight registers, and not, for example, just logical registers 0 and 1.

When used in the claims, the term "or" is used as an inclusive or and not as an exclusive or. For example, the phrase "at least one of x, y, or z" means any one of x, y, and z, as well as any combination thereof.

Having thus described illustrative embodiments in detail, it will be apparent that modifications and variations are possible without departing from the scope of the invention as claimed. The scope of inventive subject matter is not limited to the depicted embodiments but is rather set forth in the following Claims.

What is claimed is:

1. An error reporting system for a computer processor, the error reporting system comprising:
   a parity checker configured to receive data bits (D1) resulting from execution of an original instruction by the computer processor, the parity checker further configured to receive a parity bit for D1;
   a decoder configured to receive an error correcting code (ECC) for data bits (D2) resulting from execution by the computer processor of a shadow instruction of the original instruction; and
   logic to initiate a data error correction on D1 on condition of (a) a mismatch between the parity bit and D1, and (b) the decoder asserting a correctable error in D1 based on the ECC for D2.

2. The error reporting system of claim 1, the logic comprising an AND gate configured to receive an output of the parity checker and to receive a correctable error signal output (CE) of the decoder.

3. The error reporting system of claim 2, the logic comprising an INVERT-AND-OR (IAO) cell configured to receive the output of the parity checker, the correctable error signal output CE of the decoder, and a detected-uncorrectable signal output (DUE) of the decoder.

4. A method comprising:
   executing an original instruction;
   executing a shadow instruction of the original instruction;
   generating a data bits D1 from execution of the original instruction;
   generating a parity bit for D1;
   generating a data bits D2 from execution of the shadow instruction;
   generating an error correcting code (an ECC) for D2; and
   initiating a data error correction on D1 on condition that a parity checker detects a mismatch between the parity bit and D1, and a decoder asserts that the ECC indicates a correctable error in D1.

5. The method of claim 4, further comprising:
   writing D1 to a first memory bank; and
   writing the ECC and the parity bit to a second memory bank different than the first memory bank.

6. The method of claim 5, further comprising:
   storing four data bits in a first row of the first memory bank; and
   storing 16 ECCs and 16 parity bits in a first row of the second memory bank.

7. The method of claim 4, wherein D1 is 32 bits and ECC is 7 bits.

8. The method of claim 4, further comprising:
   ANDing a parity check signal and an ECC decoder correctable error signal (CE) to generate an indication of a correctable error in D1.

9. The method of claim 8, further comprising:
   asserting a detected-uncorrectable-error on condition that the parity check signal is asserted and CE is not asserted.

10. The method of claim 9, further comprising:
    also asserting the detected-uncorrectable-error on condition that the decoder indicates a detectable-uncorrectable error.

11. A computer system comprising:
    a processor; and
    an error checker for the processor configured to initiate a data error correction (DEC) for first data bits (D1) resulting from execution of an original instruction by the processor, the DEC initiated on condition of a mismatch between D1 and a parity bit for D1; and
    a decoder configured to receive an error correcting code (ECC) for second data bits (D2) resulting from execution of a shadow instruction of the original instruction by the processor, and to assert a correctable error (CE) signal in D1 based on the ECC for D2.

12. The computer system of claim 11, comprising an AND gate configured to receive an output of the error checker and to receive the CE signal.

13. The computer system of claim 12, comprising an INVERT-AND-OR (IAO) cell configured to receive (a) the output of the error checker, (b) the CE signal, and (c) a detected-uncorrectable signal output (DUE) of the decoder.

14. A data processor comprising:
    a decoder;
    a parity checker; and
    logic to initiate a data correction on first data bits D1 generated by the data processor as a result of executing an original instruction, the data correction initiated on condition that (a) the parity checker detects a parity error for D1, and (b) an error correcting code generated by the data processor for second data bits D2 as a result of executing a shadow instruction of the original instruction indicates a correctable error in D1.

15. The data processor of claim 14, wherein D1 is 32 bits and the error correcting code is 7 bits.

16. The data processor of claim 14, further comprising:
    a circuit to AND (a) the parity error, and (b) a correctable error signal (CE) resulting from decoding the error correcting code, to generate an indication of a correctable error in D1.

* * * * *